(12) United States Patent
Kim

(10) Patent No.: US 12,450,939 B2
(45) Date of Patent: Oct. 21, 2025

(54) DISPLAY DEVICE CAPABLE OF SENSING PULSE WAVE SIGNALS AND BIOMETRIC INFORMATION

(71) Applicant: SAMSUNG DISPLAY CO., LTD., Yongin-si (KR)

(72) Inventor: Chul Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/642,693

(22) Filed: Apr. 22, 2024

(65) Prior Publication Data
US 2025/0078561 A1 Mar. 6, 2025

(30) Foreign Application Priority Data
Sep. 5, 2023 (KR) .......................... 10-2023-0117820

(51) Int. Cl.
*A61B 5/0205* (2006.01)
*A61B 5/00* (2006.01)
(Continued)

(52) U.S. Cl.
CPC .......... *G06V 40/1318* (2022.01); *A61B 5/742* (2013.01); *G06F 3/0416* (2013.01);
(Continued)

(58) Field of Classification Search
CPC ............. G06F 3/0416; G06F 2203/011; G06F 2203/0381; G06F 3/0412; G06F 3/14; G06V 40/1318; G06V 40/63; G06V 40/67; G06V 40/70; G06V 40/50; H10K 59/40; G01F 1/56; A61B 5/02416; A61B 5/681; A61B 5/6898; A61B 5/7221; A61B 5/742; A61B 2560/0223; G09G 2310/08; G09G 2330/028; G09G 2360/14
See application file for complete search history.

(56) References Cited

U.S. PATENT DOCUMENTS 10,398,324 B2   9/2019   Mukkamala et al.
11,158,258 B2  10/2021   Cha et al.
(Continued)

FOREIGN PATENT DOCUMENTS

CN          113712517 A      11/2021
KR     10-2021-0064483 A      6/2021

*Primary Examiner* — Julie Anne Watko
(74) *Attorney, Agent, or Firm* — F. CHAU & ASSOCIATES, LLC

(57) ABSTRACT

A display device includes display pixels and light sensing pixels in a display area. A display scan driver is configured to drive the display pixels to emit light. A light sensing scan driver is configured to drive the light sensing pixels to sense light. A main driving circuit is configured to detect pulse wave signals and measure biometric information using the light sensing signals received through the light sensing pixels. The main driving circuit determines a normal pulse wave signal detection period or an inaccurate pulse wave signal detection period at biometric information measurement start period, changes the pulse wave signals detection conditions at the inaccurate pulse wave signal detection period to re-detect the pulse wave signals, and measures the biometric information with the normal pulse wave signal.

20 Claims, 25 Drawing Sheets

(51) Int. Cl.
 *G06F 3/041* (2006.01)
 *G06F 3/042* (2006.01)
 *G06V 40/13* (2022.01)
 *G06V 40/60* (2022.01)
 *H10K 59/40* (2023.01)

(52) U.S. Cl.
 CPC ............ *G06V 40/63* (2022.01); *H10K 59/40* (2023.02); *A61B 5/681* (2013.01); *A61B 5/6898* (2013.01); *A61B 5/7221* (2013.01)

(56) References Cited

U.S. PATENT DOCUMENTS

| | | | |
|---|---|---|---|
| 12,239,467 B2 * | 3/2025 | Kim | A61B 5/742 |
| 2019/0046048 A1 * | 2/2019 | Kitagawa | A61B 5/02116 |
| 2021/0030368 A1 | 2/2021 | Chao et al. | |
| 2021/0110130 A1 * | 4/2021 | Kim | G06V 40/1347 |
| 2021/0298618 A1 | 9/2021 | Mukkamala et al. | |
| 2021/0365664 A1 * | 11/2021 | Lee | A61B 5/02125 |
| 2022/0133161 A1 | 5/2022 | Jones et al. | |
| 2024/0358257 A1 * | 10/2024 | Kim | A61B 5/02108 |
| 2024/0370122 A1 * | 11/2024 | Kim | G09G 3/32 |

* cited by examiner

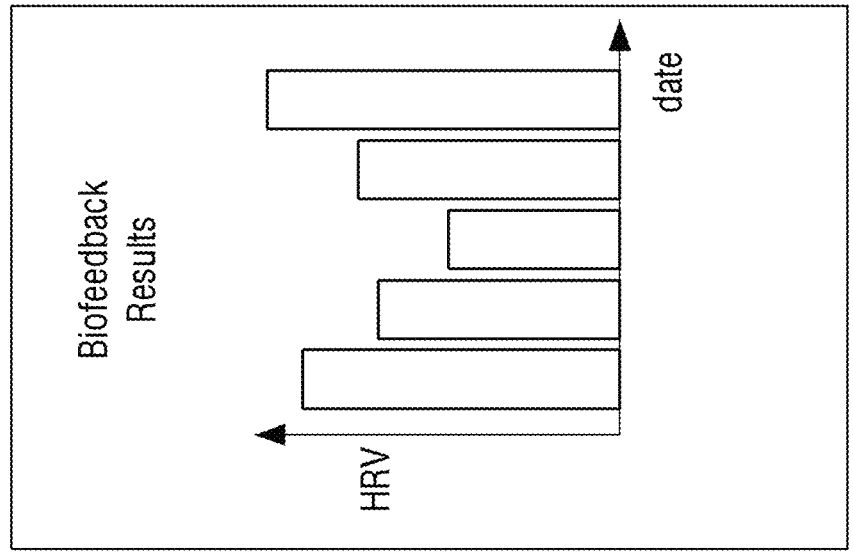
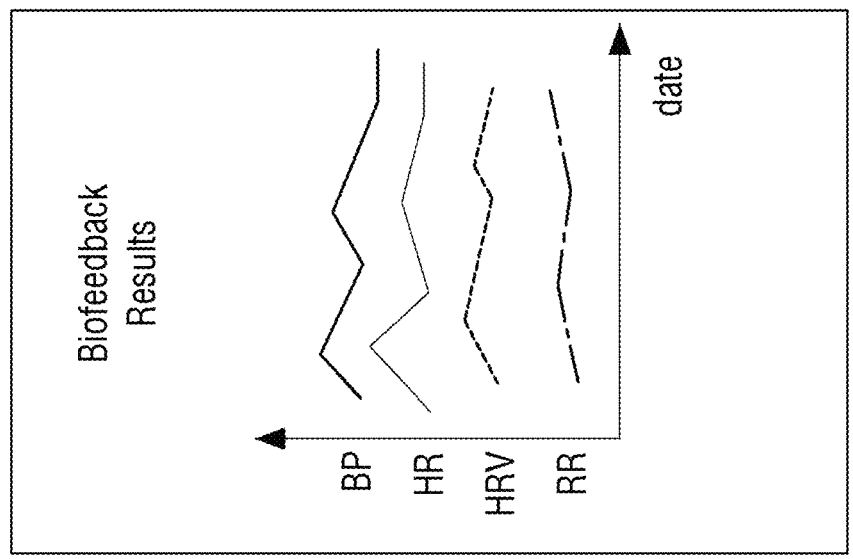
FIG. 20

FIG. 22
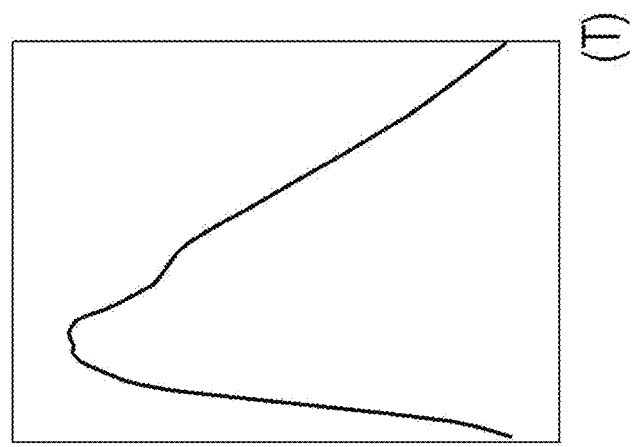
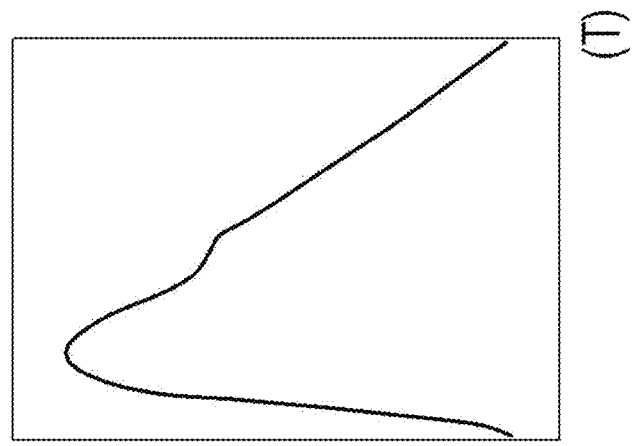
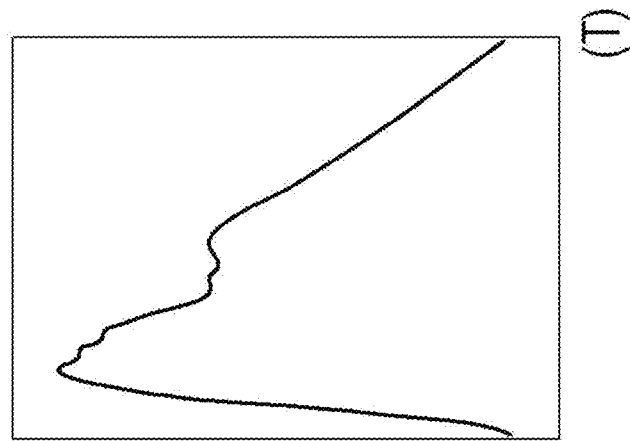

FIG. 25

| Bio-marker Sensing Results | |
|---|---|
| BP | 130 / 80 mmHg |
| HR | 70bpm |
| HRV | 60ms |
| RR | 13bpm |
| BVE | 30point |
| Cardiovascular Health | High |
| Oxygen Saturation | 90% |

| Bio-marker Sensing Results | |
|---|---|
| BP | 130 / 80mmHg |
| HR | 70bpm |
| HRV | 60ms |
| RR | 13bpm |
| BVE | 30point |
| Cardiovascular Health | High |
| Oxygen Saturation | 90% |

DISPLAY DEVICE CAPABLE OF SENSING PULSE WAVE SIGNALS AND BIOMETRIC INFORMATION

CROSS-REFERENCE TO RELATED APPLICATION

This application claims priority under 35 U.S.C. 119 to Korean Patent Application No. 10-2023-0117820 filed on Sep. 5, 2023 in the Korean Intellectual Property Office, the contents of which are incorporated by reference herein in its entirety.

TECHNICAL FIELD

The present disclosure relates to a display device and, more specifically, to a display device capable of sensing pulse wave signals and biometric information.

DISCUSSION OF THE RELATED ART

With the advance of the information-oriented society, greater demands are placed on display devices for displaying images in various ways. The display devices have been applied to various electronic devices, such as a smart phone, a digital camera, a laptop computer, a tablet PC, a navigation system, and a smart television. In the case of portable display devices such as smartphones, tablet PCs, and the like, various functions such as image capturing, fingerprint recognition, face recognition, and the like are provided.

Recently, as the healthcare industry is in the spotlight, systems and methods have been developed to more easily obtain biometric information related to health. For example, attempts have been made to replace a traditional blood pressure measuring device using an oscillometric method with a portable blood pressure measuring device. However, the portable blood pressure measuring device itself requires a separate light source, sensor, and display, and the portable blood pressure measuring device is then carried separately in addition to the portable smartphone or tablet PC, which causes inconvenience.

Recently, efforts have been made to combine a portable display device such as a smart phone, a tablet PC, or the like with a portable blood pressure measuring device. Further, systems and methods for measuring various pieces of biometric information such as a heart rate, heart rate variability, respiration, a cardiovascular disease, oxygen saturation, and the like in addition to a blood pressure using portable display devices are being developed.

SUMMARY

A display device includes display pixels arranged in a display area of a display panel. Light sensing pixels are arranged with the display pixels in the display area. A display scan driver is configured to drive the display pixels to emit light. A light sensing scan driver is configured to drive the light sensing pixels to sense light. A main driving circuit is configured to detect pulse wave signals and measure biometric information using the light sensing signals received through the light sensing pixels. The main driving circuit is configured to determine a normal pulse wave signal detection period or an inaccurate pulse wave signal detection period at biometric information measurement start period, changes the pulse wave signals detection conditions at the inaccurate pulse wave signal detection period to re-detect the pulse wave signals, and measures the biometric information with the normal pulse wave signal.

The main driving circuit may display a touch sensing area of a body part through an application program screen in the display area, display a waveform of the pulse wave signals detected in real time on a display window of the application program screen, and display a period in which the pulse wave signals are detected and a pulse wave signals detection period required for the biometric information measurement in the form of a circular or bar graph.

The main driving circuit may generate the pulse wave signals corresponding to the magnitude and the magnitude change of the light sensing signals, analyze the high pulse magnitude change and the low pulse magnitude change of the pulse wave signals in real time to calculate average magnitude values of high pulses and average magnitude values of low pulses in real time, and set a normal pulse wave signal detection period or an inaccurate pulse wave signal detection period in real time according to the comparison result of the average magnitude value of high pulses and a preset high threshold and the comparison analysis result of the average magnitude value of low pulses and a preset low threshold.

A display device includes display pixels arranged in a display area of a display panel, light sensing pixels arranged with the display pixels in the display area, infrared light emitting pixels arranged with the display pixels and the light sensing pixels in the display area. A display scan driver is configured to drive the display pixels to emit light. A light sensing scan driver is configured to drive the light sensing pixels to sense light. A touch sensing signal is disposed on the front surface of the display panel to sense touch and output a touch sensing signal. A touch driving circuit is configured to generate touch data and touch coordinate data according to a magnitude change and an output position of the touch sensing signal. A main driving circuit is configured to detect a pulse wave signals and measure biometric information using light sensing signals received through the light sensing pixels. The main driving circuit is configured to determine a normal pulse wave signal detection period or an inaccurate pulse wave signal detection period at biometric information measurement start period, change the pulse wave signals detection conditions at the inaccurate pulse wave signal detection period to re-detect the user's pulse wave signals, and measure the biometric information with the normal pulse wave signal.

The main driving circuit may generate the pulse wave signals corresponding to the magnitude and the magnitude change of the light sensing signals, analyze the high pulse magnitude change and the low pulse magnitude change of the pulse wave signals in real time to calculate average magnitude values of high pulses and average magnitude values of low pulses in real time, and set a normal pulse wave signal detection period or an inaccurate pulse wave signal detection period in real time according to the comparison result of the average magnitude value of high pulses and a preset high threshold and the comparison analysis result of the average magnitude value of low pulses and a preset low threshold.

The main driving circuit may generate an image based on the light sensing signal value and the arrangement position of the light sensing pixels which outputted light sensing signals detected by the light sensing pixels during the inaccurate pulse wave signal detection period, and display a touch guide message guiding so that a body part touch state is accurately touched and guided when a touch area derived by the light sensing signal value and the image is smaller than a preset reference area on the application program screen.

BRIEF DESCRIPTION OF THE DRAWINGS

The above and other aspects and features of the present disclosure will become more apparent by describing in detail embodiments thereof with reference to the attached drawings, in which:

FIG. 20 is a diagram illustrating a heart rate variability change state measured in real time by feeding it back to a mobile and watch-type display device as an application program screen;

FIG. 22 is a graph illustrating a method for calculating information on blood vessel elasticity among biometric information according to an embodiment;

FIG. 25 is a diagram showing a biometric information measurement result through a mobile display device and a watch type display device.

DETAILED DESCRIPTION OF THE EMBODIMENTS

The present disclosure will now be described more fully hereinafter with reference to the accompanying drawings, in which embodiments of the disclosure are shown. This disclosure may, however, be embodied in different forms and should not necessarily be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers may indicate the same components throughout the specification and the drawings.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments will be described in detail with reference to the accompanying drawings.

Figure 1:
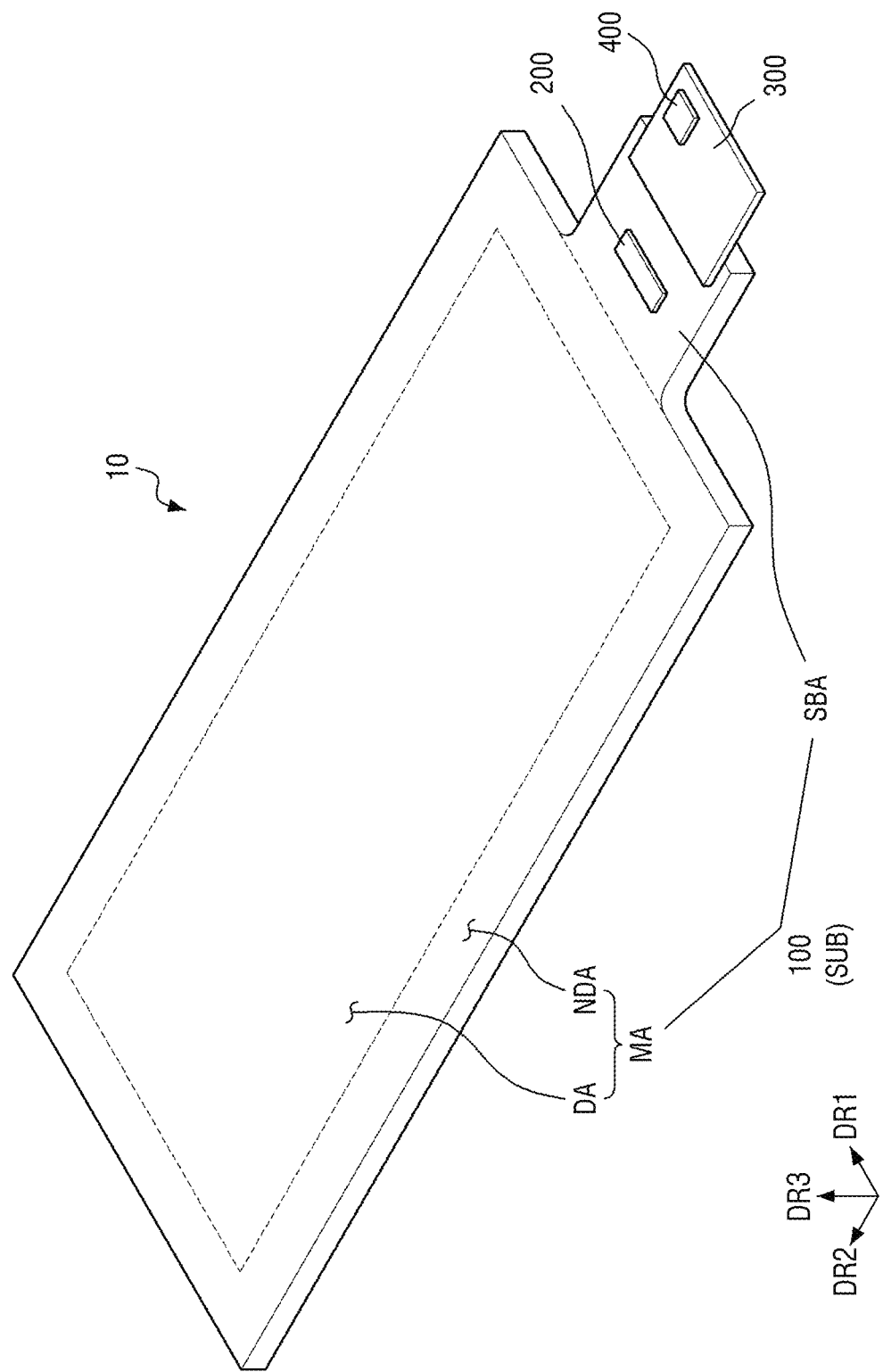
FIG. 1 is a perspective view illustrating a display device according to an embodiment.
Figure 2:
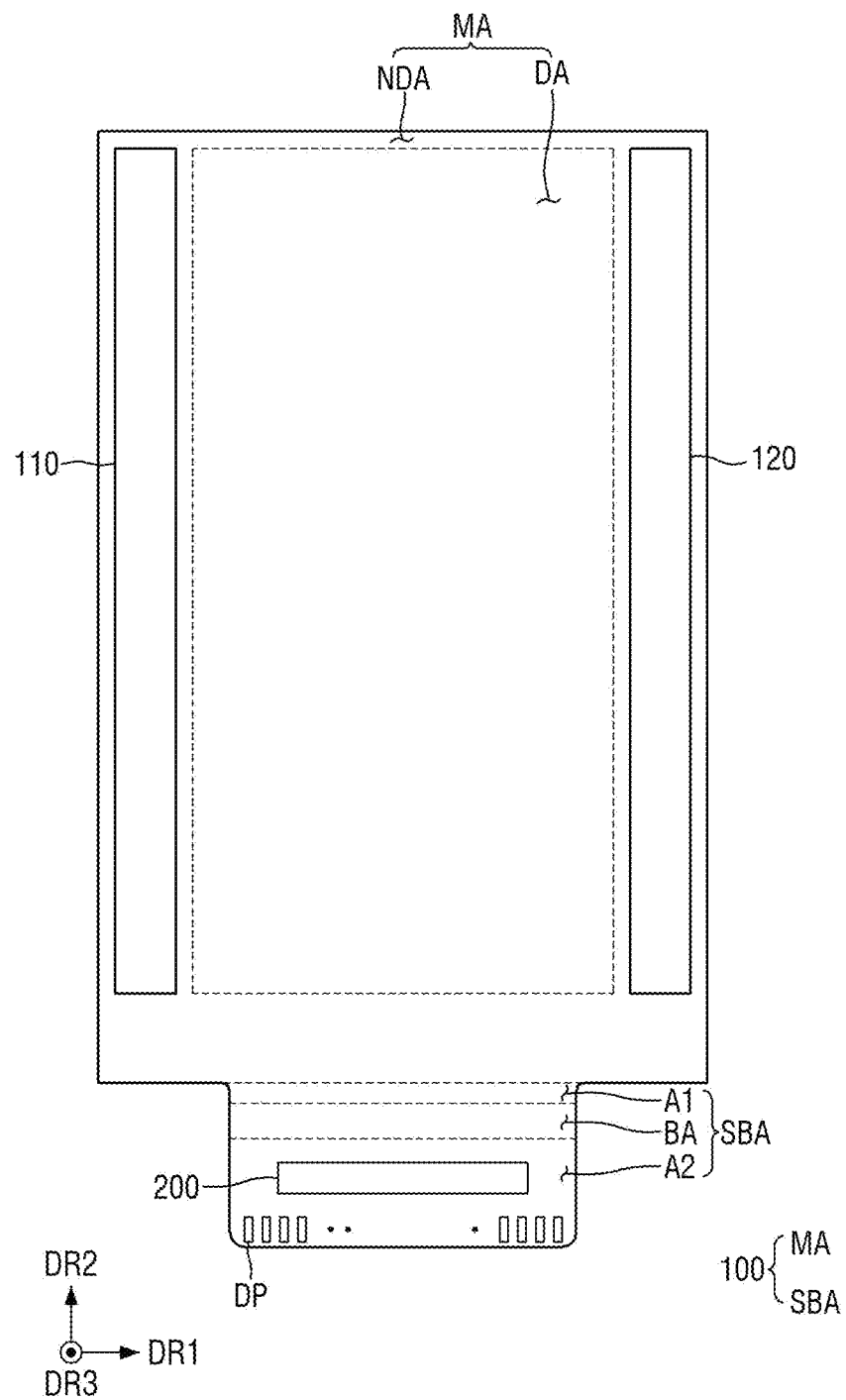
FIG. 2 is a plan view illustrating an arrangement structure of a display panel and a display driving circuit shown in FIG. 1.
Figure 3:
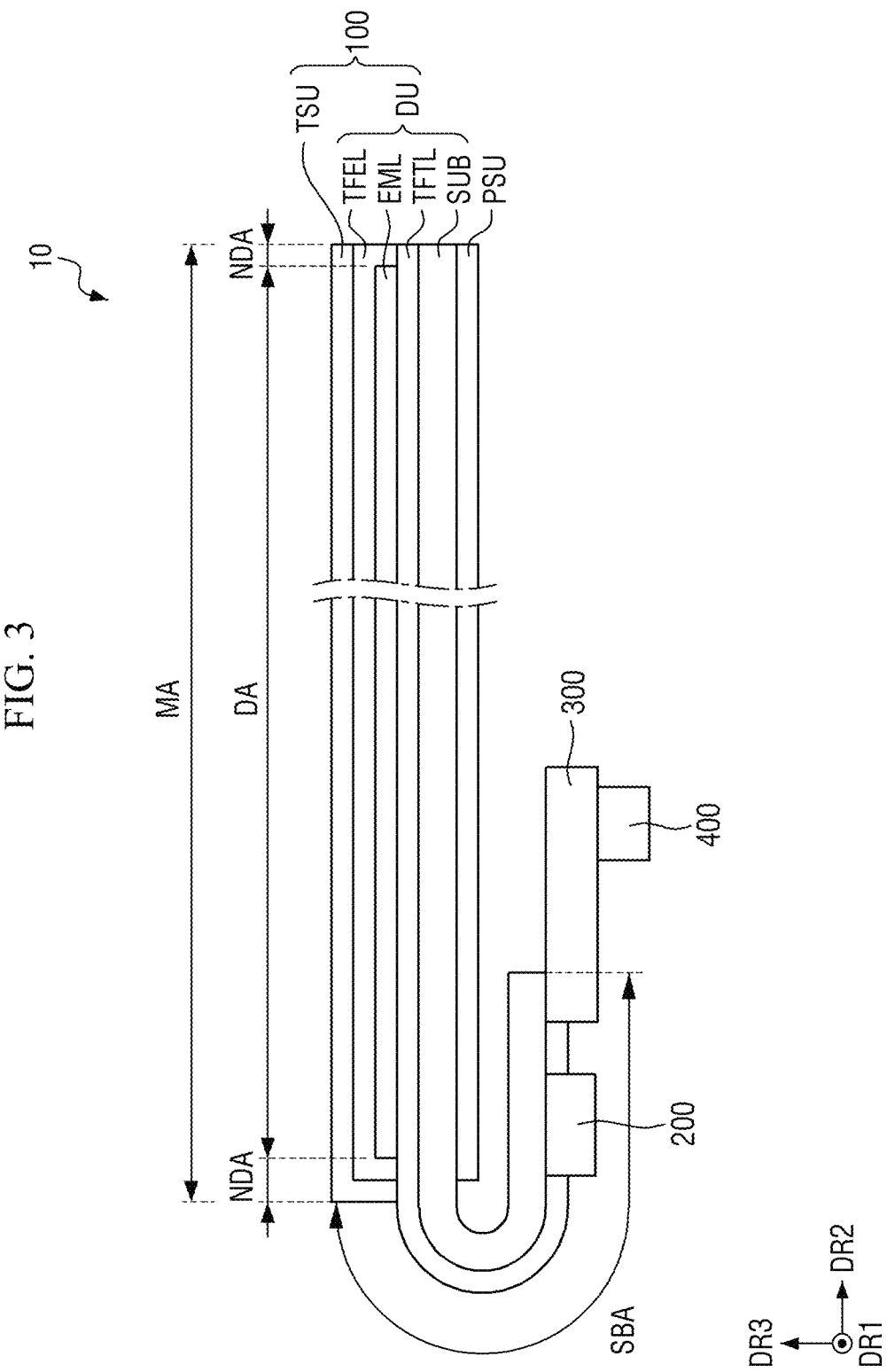
FIG. 3 is a cross-sectional view showing a configuration of the display device shown in FIG. 1.

FIG. 1 is a perspective view illustrating a display device according to an embodiment. FIG. 2 is a plan view illustrating an arrangement structure of a display panel and a display driving circuit shown in FIG. 1. FIG. 3 is a cross-sectional view specifically showing the configuration of the display device shown in FIG. 1.

Referring to FIGS. 1 and 2, a display device 10, according to an embodiment, may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. Further, the display device 10, according to an embodiment, may be applied as a display unit of a television, a laptop, a computer monitor, a digital billboard, or an Internet-of-Things (IoT) device. Alternatively, the display device 10, according to an embodiment, may be applied to wearable devices such as a smart watch, a watch phone, a glasses type display, or a head mounted display (HMD). Further, the display device 10, according to an embodiment, may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

The display device 10 may be a light emitting display device such as an organic light emitting diode (OLED) display device using an organic light emitting diode, a quantum dot light emitting display device including a quantum dot light emitting layer, an inorganic light emitting display device including an inorganic semiconductor, and a micro light emitting display device using a micro or nano light emitting diode (LED). In the following description, it is assumed that the display device 10 is an organic light emitting diode display device, but the present disclosure is not necessarily limited thereto.

Referring to FIGS. 1 and 3, the display device 10 includes a display panel 100, a main driving circuit 200, a touch sensing unit TSU, a pressure sensing unit PSU, a circuit board 300, and a touch driving circuit 400.

The display panel 100 may, in a plan view, be formed in a rectangular shape having a pair of short sides extending in a first direction DR1 and a pair of long sides extending in a second direction DR2 crossing the first direction DR1. A corner where the short side in the first direction DR1 and the long side in the second direction DR2 meet may be right-angled or rounded to have a predetermined curvature. The planar shape of the display panel 100 is not necessarily limited to the rectangular shape, and may be formed in another polygonal shape, a circular shape or an elliptical shape. The display panel 100 may be flat, but is not necessarily limited thereto. For example, the display panel 100 may include a curved portion formed at left and right ends and having a constant curvature or a varying curvature. In addition, the display panel 100 may be formed flexibly so that it can be curved, bent, folded, or rolled to a noticeable degree without cracking or otherwise sustaining damage.

A substrate SUB of the display panel 100 may include a main region MA and a sub-region SBA.

The main region MA may include a display area DA displaying an image and a non-display area NDA that is a peripheral area of the display area DA.

The non-display area NDA may be disposed adjacent to the display area DA. The non-display area NDA may be an area outside the display area DA. The non-display area NDA may at least partially surround the display area DA. The non-display area NDA may be an edge area of the display panel 100.

The display area DA includes display pixels for displaying an image, and light sensing pixels for sensing light reflected from a user's body part such as a face or a finger. Further, the display area DA may further include infrared light emitting pixels emitting infrared light.

The display area DA may occupy most of the main region MA. The display area DA may be disposed at the center of the main region MA.

The display area DA may be divided into an image display area IDA, in which only the display pixels are disposed without the light sensing pixels, and a biometric information measurement area FSA, in which the display pixels and the light sensing pixels are mixed and disposed. For example, the light sensing pixels may be disposed together with the display pixels only in a predetermined part of the biometric information measurement area FSA in the entire display area DA of the display panel 100. An example in which the display pixels and the light sensing pixels are alternately arranged in the entire display area DA will be described below.

Referring to FIGS. 2 and 3, the sub-region SBA may protrude from one side of the main region MA in the second direction DR2. The length of the sub-region SBA in the second direction DR2 may be less than the length of the main region MA in the second direction DR2. The length of the sub-region SBA in the first direction DR1 may be substantially equal to or less than the length of the main region MA in the first direction DR1.

The sub-region SBA may include a first region A1, a second region A2, and a bending area BA.

The first region A1 is a region protruding from one side of the main region MA in the second direction DR2. One side of the first region A1 may be in contact with the non-display area NDA of the main region MA, and the other side of the first region A1 may be in contact with the bending area BA.

The second region A2 is a region on which pads DP and the main driving circuit 200 are disposed. The main driving circuit 200 may be attached to driving pads of the second region A2 using a conductive adhesive such as an anisotropic conductive layer. The circuit board 300 may be attached to the pads DP of the second region A2 using a conductive adhesive. One side of the second region A2 may be in contact with the bending area BA.

The bending area BA is an area that is in a bent state. When the bending area BA is bent, the second region A2 may be disposed under the first region A1 and under the main region MA. The bending area BA may be disposed between the first region A1 and the second region A2. One side of the bending area BA may be in contact with the first region A1, and the other side of the bending area BA may be in contact with the second region A2.

As shown in FIG. 3, the sub-region SBA may be bent, and in this case, it may be disposed under the main region MA. The sub-region SBA may overlap the main region MA in a third direction DR3.

The touch sensing unit TSU for sensing a body part such as a finger, an electronic pen/stylus, or the like is formed or disposed on the front portion of the display panel 100. The touch sensing unit TSU may include a plurality of touch electrodes to sense a user's touch in a capacitive manner.

The touch sensing unit TSU includes a plurality of touch electrodes intersecting each other in the first and second directions DR1 and DR2. For example, the plurality of touch electrodes include a plurality of driving electrodes may be spaced apart from each other in parallel in the first direction DR1, and a plurality of sensing electrodes may be spaced apart from each other in parallel in the second direction DR2 so as to intersect the plurality of driving electrodes with an organic material layer or an inorganic material layer interposed therebetween. The plurality of driving electrodes and the plurality of sensing electrodes may extend to a wiring region between display pixels SP and light sensing pixels arranged in the display area DA so as not to overlap the display pixels and the light sensing pixels. The plurality of driving electrodes and the plurality of sensing electrodes form a mutual capacitance, and transmit touch sensing signals that vary according to a user's touch to the touch driving circuit 400.

The touch driving circuit 400 supplies touch driving signals to the plurality of driving electrodes and receives the touch sensing signals from the plurality of sensing electrodes RE. Then, the change in the mutual capacitance between the driving electrodes and the sensing electrodes is sensed according to the change in the magnitude of the touch sensing signal. The touch driving circuit 400 generates touch data according to the change in the mutual capacitance between the driving electrodes and the sensing electrodes and obtains a position where a touch is sensed. Accordingly, coordinate data of the position where the touch is sensed may be supplied to the main driving circuit 200.

Figure 4:
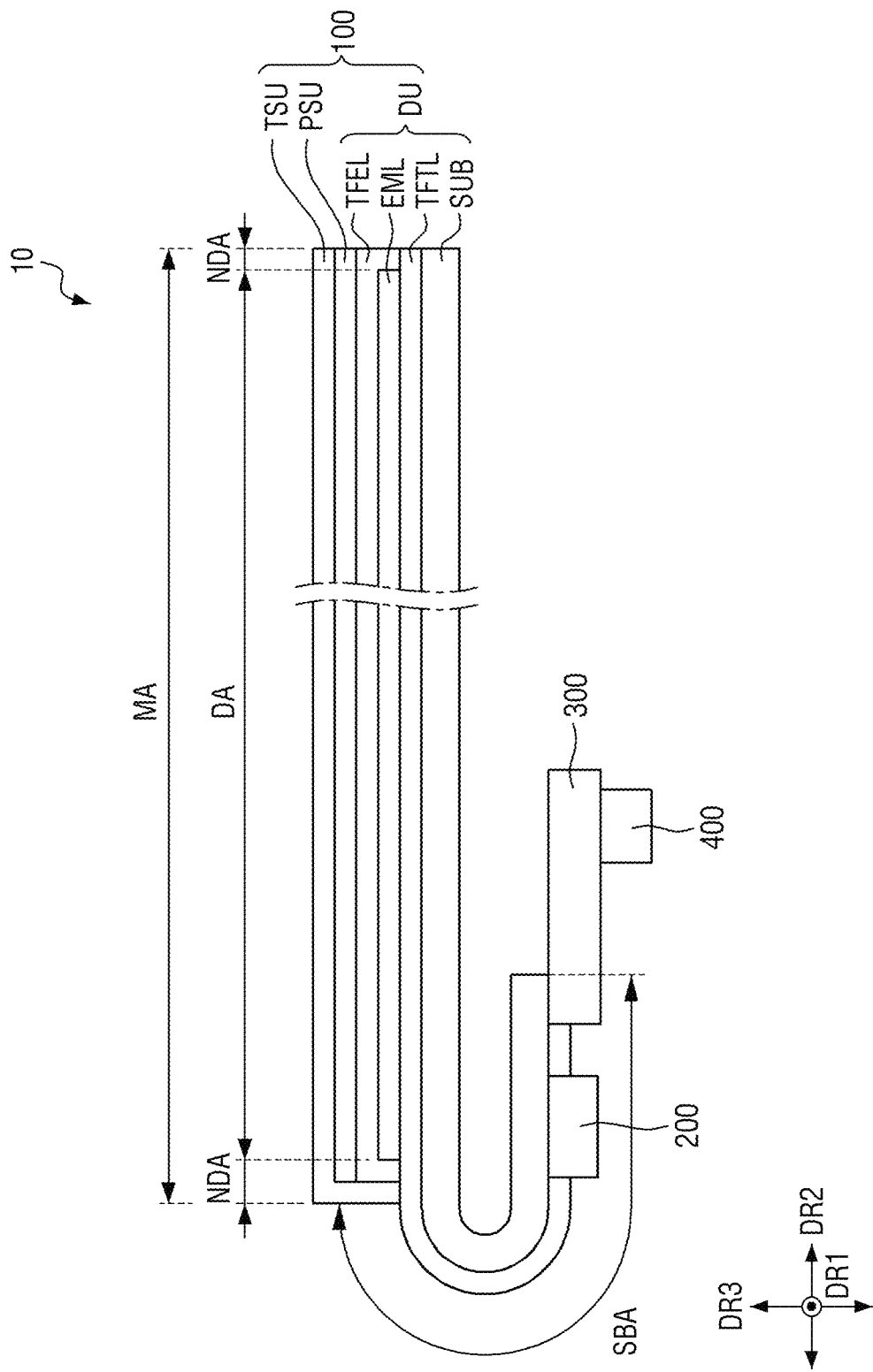
FIG. 4 is a cross-sectional view of an embodiment illustrating a configuration of the display device shown in FIG. 1.

FIG. 4 is a cross-sectional view of an embodiment specifically illustrating the configuration of the display device shown in FIG. 1.

The pressure sensing unit PSU for sensing the pressure applied by a body part such as a finger or the like may be disposed or formed on the front surface of the display panel 100, for example, on the surface between the display panel 100 and the touch sensing unit TSU. Like described above, the pressure sensing unit PSU may be formed on the front surface of the display panel 100 and the rear surface of the touch sensing unit TSU. Alternatively, the pressure sensing unit PSU may be formed on the rear surface of the substrate SUB, or the front surface of the substrate SUB.

The pressure sensing unit PSU is used in the case of detecting absolute blood pressure-related measurement values, but might not be required in the case of detecting relative blood pressure-related measurement values.

In the case where the pressure sensing unit PSU is formed, the pressure sensing unit PSU may be formed of a transparent sheet type in which a plurality of transparent electrodes are arranged in vertical and horizontal directions, and may be disposed on the front surface of the main region MA. Alternatively, the pressure sensing unit PSU may be disposed or formed inside or on the front portion of the display panel 100.

The pressure sensing unit PSU includes a plurality of pressure sensing electrodes intersecting each other in the first direction DR1 and the second direction DR2. The plurality of pressure sensing electrodes include a plurality of lower electrodes spaced apart from each other in parallel in the first direction DR1, and a plurality of upper electrodes spaced apart from each other in parallel in the second direction DR2 so as to intersect the plurality of lower electrodes with a transparent inorganic (or organic) material layer interposed therebetween. The plurality of lower electrodes and the plurality of upper electrodes form a self-capacitance with a transparent inorganic (or organic) material layer interposed therebetween, and transmit pressure sensing signals that vary according to a user's touch pressure to the touch driving circuit 400.

When the pressure sensing unit PSU is disposed on the inner surface or the front surface of the display panel 100, the pressure sensing electrodes, i.e., the plurality of lower electrodes and the plurality of upper electrodes, of the pressure sensing unit PSU may extend to the wiring region between the display pixels and the light sensing pixels arranged in the display area DA so as not to overlap the display pixels and the light sensing pixels. The touch driving circuit 400 may supply a reference voltage to the lower electrodes of the pressure sensing unit PSU, and receive pressure sensing signals from the upper electrodes thereof, thereby sensing the changes in the self-capacitance of the pressed areas using the pressure sensing signals. Accordingly, the touch driving circuit 400 may generate pressure data according to the amount of change in the self-capacitance and sensing coordinate data of a position where a touch is sensed and supply the generated data to the main driving circuit 200. The pressure sensing unit PSU may be applied to various other structures in addition to the structure using the pressure sensing electrodes, and is not necessarily limited to the description of FIGS. 3 and 4.

The circuit board 300 may be attached to one end of the sub-region SBA. Thus, the circuit board 300 may be electrically connected to the display panel 100 and the main driving circuit 200. The display panel 100 and the main driving circuit 200 may receive digital video data, timing signals, and driving voltages through the circuit board 300. The circuit board 300 may be a flexible printed circuit board, a printed circuit board, or a flexible film such as a chip on film.

The main driving circuit 200 may generate electrical signals such as data voltages and control signals for driving the display panel 100. The touch driving circuit 400 including the main driving circuit 200 may be formed as an integrated circuit (IC) and attached onto the display panel 100 or the circuit board 300 by a chip on glass (COG) method, a chip on plastic (COP) method, or an ultrasonic bonding method, but the present disclosure is not necessarily limited thereto. For example, the touch driving circuit 400 including the main driving circuit 200 may be attached onto the circuit board 300 by a chip on film (COF) method.

Figure 5:
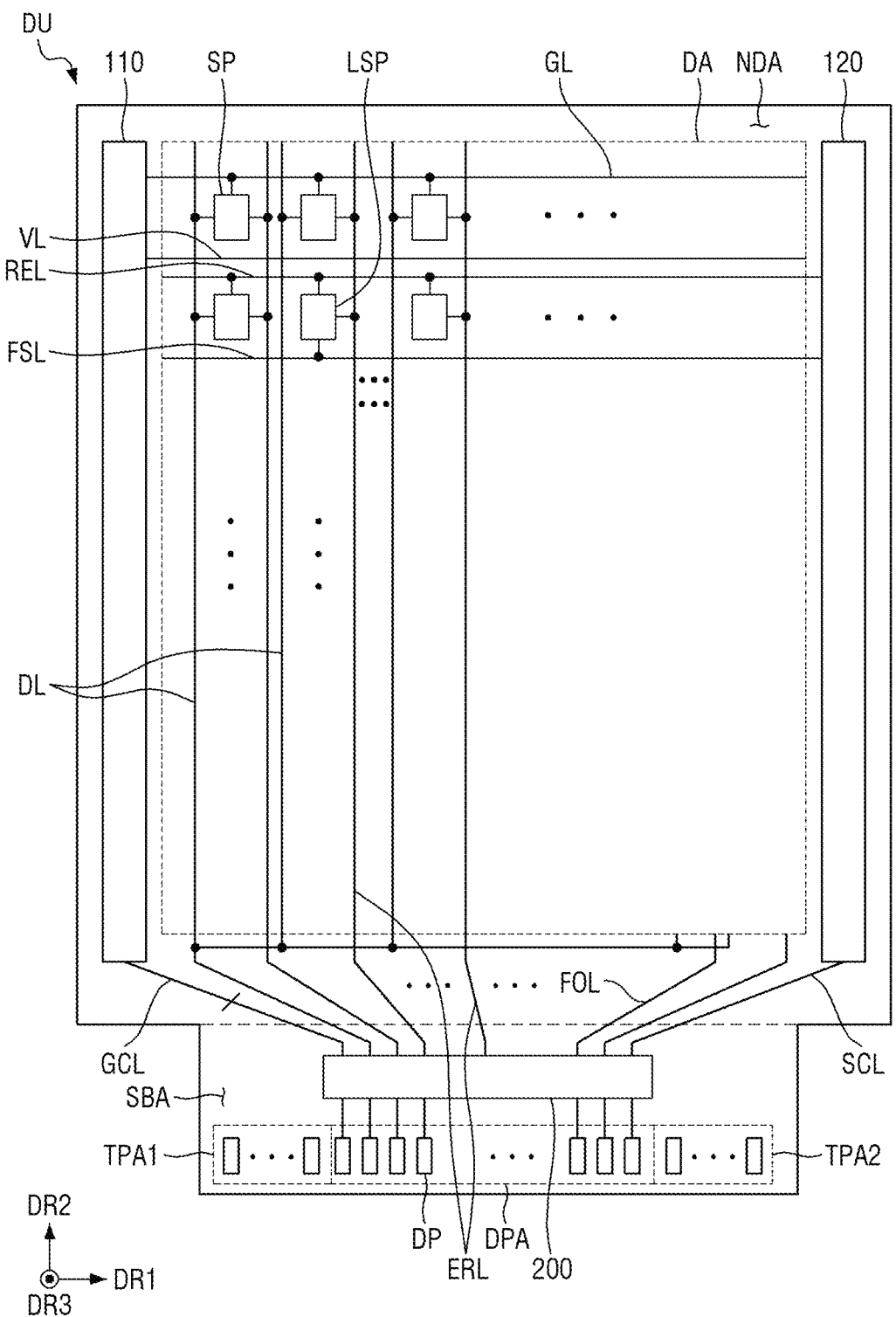
FIG. 5 is a layout diagram schematically showing an example of the display panel illustrated in FIGS. 1 to 4.

FIG. 5 is a layout diagram schematically showing an example of the display panel illustrated in FIGS. 1 to 4. For example, FIG. 5 is a layout diagram illustrating the display area DA and the non-display area NDA of a display module DU before the touch sensing unit TSU is formed thereon.

Referring to FIG. 5 together with FIG. 4, a display scan driver 110, a light sensing scan driver 120, and a main driving circuit 200 may be disposed on the display panel 100 of the display device 10 according to an embodiment. Further, a touch driving circuit 400 and a power supply unit may be disposed on the circuit board 300 connected to the display panel 100. Here, the main driving circuit 200 and the touch driving circuit 400 may be integrally formed of a one-chip type, and may be mounted onto the display panel 100 or the circuit board 300. However, hereinafter, for simplicity of functional description, an example in which the main driving circuit 200 and the touch driving circuit 400 are formed as different integrated circuits will be described.

Referring to FIG. 5, the display panel 100 may include the display pixels SP, the light sensing pixels LSP, display scan lines GL, emission control lines VL, data lines DL, sensing scan lines FSL, sensing reset lines REL, and light sensing lines ERL that are disposed in the display area DA. Each of the display scan driver 110 and the light sensing scan driver 120 are disposed in the non-display area NDA.

The display scan lines GL sequentially supply the display scan signals applied in units of horizontal lines from the display scan driver 110 to the display pixels SP and light sensing pixels LSP for each horizontal line. The display scan lines GL may extend in the first direction DR1 and may be spaced apart from each other in the second direction DR2 intersecting the first direction DR1.

The emission control lines VL sequentially supply the emission control signals applied in units of horizontal lines from the display scan driver 110 to the display pixels SP and the light sensing pixels LSP for each horizontal line. The emission control lines VL may extend in the first direction DR1, in parallel with the display scan lines GL, and may be spaced apart from each other in the second direction DR2 intersecting the first direction DR1.

The data lines DL may supply the data voltage received from the main driving circuit 200 to the plurality of display pixels SP. The plurality of data lines DL may extend in the second direction DR2 and may be spaced apart from each other in the first direction DR1.

The light sensing scan lines FSL sequentially supply the sensing scan signals applied in units of horizontal lines from the light sensing scan driver 120 to the plurality of light sensing pixels LSP. The light sensing scan line FSL may extend in the first direction DR1 and may be spaced apart from each other in the second direction DR2 intersecting the first direction DR1.

The sensing reset lines REL sequentially supply the sensing reset signals applied in units of horizontal lines from the light sensing scan driver 120 to the plurality of light sensing pixels LSP for each horizontal line. The sensing reset lines REL may extend in the first direction DR1, in parallel with the light sensing scan lines FSL, and may be spaced apart from each other in the second direction DR2 intersecting the first direction DR1.

The light sensing lines ERL are connected between the light sensing pixels LSP and the main driving circuit 200 to supply the light sensing signals outputted from the light sensing pixels LSP to the main driving circuit 200. The light sensing lines ERL may be disposed and extended in the second direction DR2 according to the arrangement direction of the main driving circuit 200, and may be spaced apart from each other in the first direction DR1.

The non-display area NDA may at least partially surround the display area DA. The non-display area NDA may include the display scan driver 110, the light sensing scan driver 120, fan-out lines FOL, gate control lines GCL, and light sensing control lines SCL.

The display pixels SP and the light sensing pixels LSP may form a first unit pixel and may be arranged in a matrix form in the first direction DR1 and the second direction DR2 in the display area DA. When at least one infrared light emitting pixel is additionally disposed in the display area DA, the display pixels SP and at least one infrared light emitting pixel may form a second unit pixel, and the second unit pixels and the first unit pixels may be alternately arranged in a matrix form in the display area DA.

For example, three display pixels SP that respectively display red, green, and blue light, and one light sensing pixel LSP may form one first unit pixel. In addition, three display pixels SP that respectively display red, green, and blue light, and one infrared light emitting pixel may form one second unit pixel. The first unit pixels and the second unit pixels may be alternately arranged in horizontal or vertical stripes in a matrix form. Alternatively, the first unit pixels and the second unit pixels may be alternately arranged in a zigzag shape in a plan view, and may be arranged in a matrix form in one diagonal direction.

Each of the red, green, and blue display pixels SP and the infrared light emitting pixels may be connected to any one of the display scan lines GL and any one of the emission control lines VL. During an image display period, the red, green, and blue display pixels SP may receive the data voltage of the data line DL according to the display scan signal of the display scan line GL and the emission control signal of the emission control line VL, and may supply a driving current to the light emitting element according to the data voltage, thereby emitting light. Here, during the measurement period of biometric information such as a blood pressure, a heart rate, oxygen saturation, blood vessel elasticity, and the like, the display pixels SP displaying at least one color among the red, green, and blue display pixels SP may selectively receive the data voltage for light emission together with the display scan signal and the emission control signal and display light. Further, during the measurement period of biometric information such as a blood pressure, a heart rate, and the like, the infrared light emitting pixels may selectively receive the data voltage for light emission together with the display scan signal and the emission control signal and display infrared light.

The light sensing pixels LSP may be alternately arranged with the red, green, and blue display pixels SP in a vertical or horizontal direction. Each of the light sensing pixels LSP may be connected to one of the light sensing scan lines FSL, one of the sensing reset lines REL, and one of the light sensing lines ERL. During the measurement period of biometric information such as a blood pressure, a respiratory rate, oxygen saturation, presence or absence of a cardiovascular disease, or the like, each of the light sensing pixels LSP is reset in response to the sensing reset signal from the sensing reset lines REL, and then may generate and output the light sensing signal corresponding to the light amount of the reflected lights incident from the front surface. Further, each of the light sensing pixels LSP may transmit the light sensing signal to the light sensing line ERL in response to the sensing scan signal from the light sensing scan lines FSL.

The light sensing pixels LSP in units of horizontal lines may be connected to one display scan line GL for each horizontal line. Each of the light sensing pixels LSP may generate the light sensing signal corresponding to the light amount of the reflected lights incident from the front surface, and may output the light sensing signal to the light sensing line ERL in response to the display scan signal inputted through the display scan line GL.

A display scan driver 110 may be provided in the non-display area NDA. Although the display scan driver 110 is illustrated as on one side (e.g., left side) of the display panel 100, it is not necessarily limited to the drawings herein. For example, the display scan driver 110 may be disposed on both sides (e.g., left and right sides) of the display panel 100.

The display scan driver 110 may be electrically connected to the main driving circuit 200 through the gate control lines GCL. The display scan driver 110 receives the scan control signal from the main driving circuit 200, and sequentially generates the display scan signals in units of horizontal line driving periods according to the scan control signal and sequentially supplies them to the display scan lines GL. Further, the display scan driver 110 may sequentially generate the emission control signals according to the scan control signal from the main driving circuit 200 and sequentially supply them to the emission control lines VL.

The gate control line GCL may extend from the main driving circuit 200 to the display scan driver 110 according to the arrangement position of the display scan driver 110. The gate control line GCL may supply the scan control signal received from the main driving circuit 200 to the display scan driver 110.

The light sensing scan driver 120 may be disposed in another non-display area NDA different from that of the display scan driver 110. FIG. 5 illustrates that the light sensing scan driver 120 is disposed on the other side (for example, the right side) of the display panel 100, but the present disclosure is not necessarily limited thereto. The light sensing scan driver 120 may be electrically connected to the main driving circuit 200 through the light sensing control lines SCL. The light sensing scan driver 120 receives the light sensing control signal from the main driving circuit 200, and sequentially generates the reset control signals and the light sensing scan signals in units of horizontal line driving periods according to the light sensing control signal. Then, the sequentially generated reset control signals are sequentially supplied to the sensing reset lines REL. Further, the light sensing scan driver 120 may sequentially generate the sensing scan signals according to the light sensing control signal from the main driving circuit 200 and sequentially supply them to the sensing scan lines FSL.

The light sensing control line SCL may extend from the main driving circuit 200 to the light sensing scan driver 120 according to the arrangement position of the light sensing scan driver 120. The light sensing control line SCL may supply the light sensing control signal received from the main driving circuit 200 to the light sensing scan driver 120.

The sub-region SBA may include the main driving circuit 200, a display pad area DPA, and first and second touch pad areas TPA1 and TPA2. The display pad area DPA, the first touch pad area TPA1, and the second touch pad area TPA2 may be disposed at the edge of the sub-region SBA. The display pad area DPA, the first touch pad area TPA1, and the second touch pad area TPA2 may be electrically connected to the circuit board 300 by using an anisotropic conductive film or a low-resistance high-reliability material such as SAP.

The fan-out lines FOL may extend from the main driving circuit 200 to the display area DA. Further, the fan-out lines FOL are connected such that the data voltage received from the main driving circuit 200 may be supplied to each of the plurality of data lines DL.

The main driving circuit 200 may output signals and voltages for driving the display panel 100 to the fan-out lines FOL. The main driving circuit 200 may supply a data voltage to the data line DL through the fan-out lines FOL. The data voltage may be supplied to the plurality of display pixels SP to determine the luminance of the display pixels SP. The main driving circuit 200 may supply the scan control signal to the display scan driver 110 through the gate control line GCL.

The main driving circuit 200 receives the light sensing signals from the light sensing pixels LSP through the light sensing lines ERL, and detects a photoplethysmography signal among biometric signals corresponding to the change in the magnitudes of the light sensing signals, for example, pulse wave signals.

In addition to the pulse wave signal, the biometric signals may further include an electromyography (EMG) signal, an electroencephalogram (EEG) signal, and the like. However, an example in which the main driving circuit 200 detects and analyzes pulse wave signals among biometric signals to measure the user's biometric information will be described below. The biometric information of the user includes information such as blood pressure, heart rate, heart rate variability, respiratory rate, blood vessel elasticity, occurrence or non-occurrence of a cardiovascular disease, oxygen saturation, and the like.

The main driving circuit 200 may guide a pulse wave signal detection process with a preset application program screen so that the user's pulse wave signals may be accurately detected, and may analyze the pulse wave signals to sample and select more accurately detected pulse wave signals. Then, the main driving circuit 200 analyzes the pulse wave signals in units of preset periods to measure biometric information such as a blood pressure, a heart rate, heart rate variability, a respiratory rate, blood vessel elasticity, occurrence or non-occurrence of a cardiovascular disease, oxygen saturation, and the like. Accordingly, the main driving circuit 200 may display the measurement results of the biometric information such as a blood pressure, a heart rate, heart rate variability, a respiratory rate, blood vessel elasticity, occurrence or non-occurrence of a cardiovascular disease, oxygen saturation, and the like on the application program screen.

Figure 6:
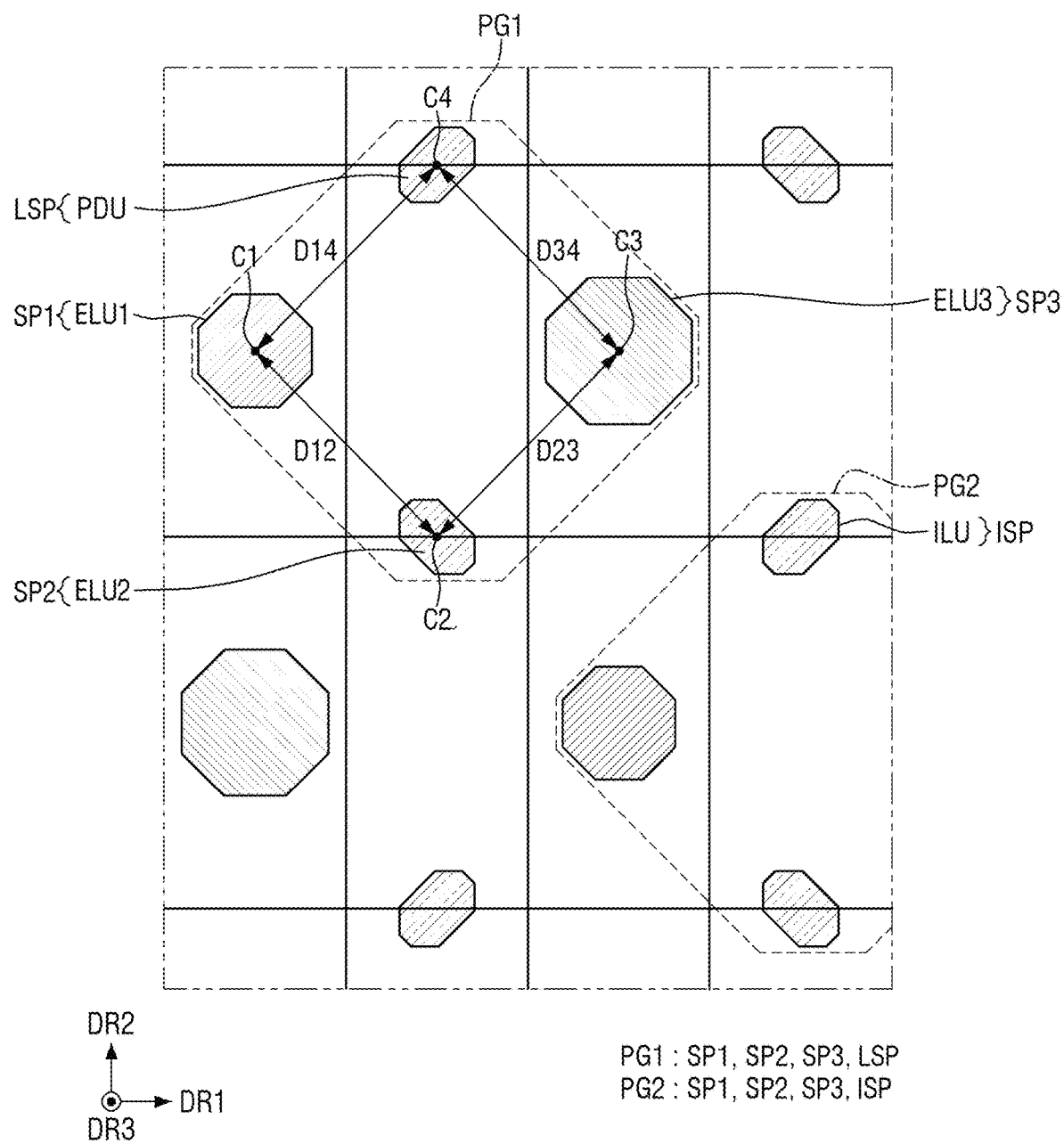
FIG. 6 is a layout diagram illustrating a display area according to an embodiment.

FIG. 6 is a layout diagram illustrating a display area according to an embodiment.

Referring to FIG. 6, the display area DA may include the display pixels SP, infrared light emitting pixels ISP, and the light sensing pixels LSP. Here, the display pixels SP may be divided into the first display pixels SP1, the second display pixels SP2, and the third display pixels SP3.

The light sensing pixel LSP including the first display pixel SP1, the second display pixel SP2, and the third display pixel SP3 may be defined as a first unit pixel PG1. Further, the infrared light emitting pixel ISP including the first display pixel SP1, the second display pixel SP2, and the third display pixel SP3 may be defined as a second unit pixel PG2.

The first and second unit pixels PG1 and PG2 may be defined as minimum unit for display pixels capable of displaying white light, and each first unit pixel PG1 may sense light. The first unit pixels PG1 and the second unit pixels PG2 may be alternately arranged in a zigzag shape in a plan view, and may be arranged in a matrix form in one diagonal direction. Further, the first unit pixels PG1 and the second unit pixels PG2 may be alternately arranged in horizontal or vertical stripes in a matrix form in a plan view.

The first display pixel SP1 may include a first light emitting portion ELU1 that emits first light, and a first pixel driver for applying a driving current to the light emitting element of the first light emitting portion ELU1. The first light may be light of a red wavelength band. For example, the main peak wavelength of the first light may be located at approximately 600 nm to 750 nm.

The second display pixel SP2 may include a second light emitting portion ELU2 that emits a second light, and a second pixel driver for applying a driving current to the light emitting element of the second light emitting portion ELU2. The second light may be light of a blue wavelength band. For example, the main peak wavelength of the second light may be located at approximately 370 nm to 460 nm.

The third display pixel SP3 may include a third light emitting portion ELU3 that emits a third light, and a third pixel driver for applying a driving current to the light emitting element of the third light emitting portion ELU3. For example, the third light may be light of a green wavelength band. For example, the main peak wavelength of the third light may be located at approximately 480 nm to 560 nm.

The infrared light emitting pixel ISP may include an infrared light emitting portion ILU emitting light of an infrared wavelength band and an infrared light pixel driver IDU for applying a driving current to the light emitting element of the infrared light emitting portion ILU. The main peak wavelength of the infrared light may be located at approximately 750 nm to 1 mm.

The light sensing pixel LSP includes a light sensing portion PDU and a sensing driver.

In the first unit pixel GP1, the first to third pixel drivers may be arranged in a preset order in the first direction DR1. Alternatively, any one of the first to third pixel drivers may be disposed in the first direction DR1 of another adjacent pixel driver. Further, the sensing driver may be disposed in the first direction DR1 of any one of the first to third pixel drivers. Alternatively, the sensing driver may be disposed in the second direction DR2 of any one of the first to third pixel drivers.

The first pixel drivers adjacent to each other in the direction of the data line DL may be disposed in the second direction DR2. The second pixel drivers adjacent to each other in the direction of the data line DL may be disposed in the second direction DR2. Similarly, all the sensing drivers adjacent to each other in the direction of the data line DL may also be disposed in the second direction DR2.

The first light emitting portion ELU1, the second light emitting portion ELU2, the third light emitting portion ELU3, the infrared light emitting portion ILU, and the light sensing portion PDU may have a rectangular, octagonal, or rhombic planar shape, but the present disclosure is not necessarily limited thereto. The first light emitting portion ELU1, the second light emitting portion ELU2, the third light emitting portion ELU3, the infrared light emitting portion ILU, and the light sensing portion PDU may have another polygonal planar shape other than a rectangle, an octagon, and a rhombus.

Due to the arrangement position and planar shape of the first light emitting portion ELU1, the second light emitting portion ELU2, the third light emitting portion ELU3, and the light sensing portion PDU, a distance D12 between a center C1 of the first light emitting portion ELU1 and a center C2 of the second light emitting portion ELU2 adjacent to each other, a distance D23 between the center C2 of the second light emitting portion ELU2 and a center C3 of the third light emitting portion ELU3 adjacent to each other, a distance D14 between the center C1 of the first light emitting portion ELU1 and a center C2 of the second light emitting portion ELU2 adjacent to each other in another direction, and a distance D34 between a center C4 of the second light emitting portion ELU2 and the center C3 of the third light emitting portion ELU3 may all be substantially the same.

Figure 7:
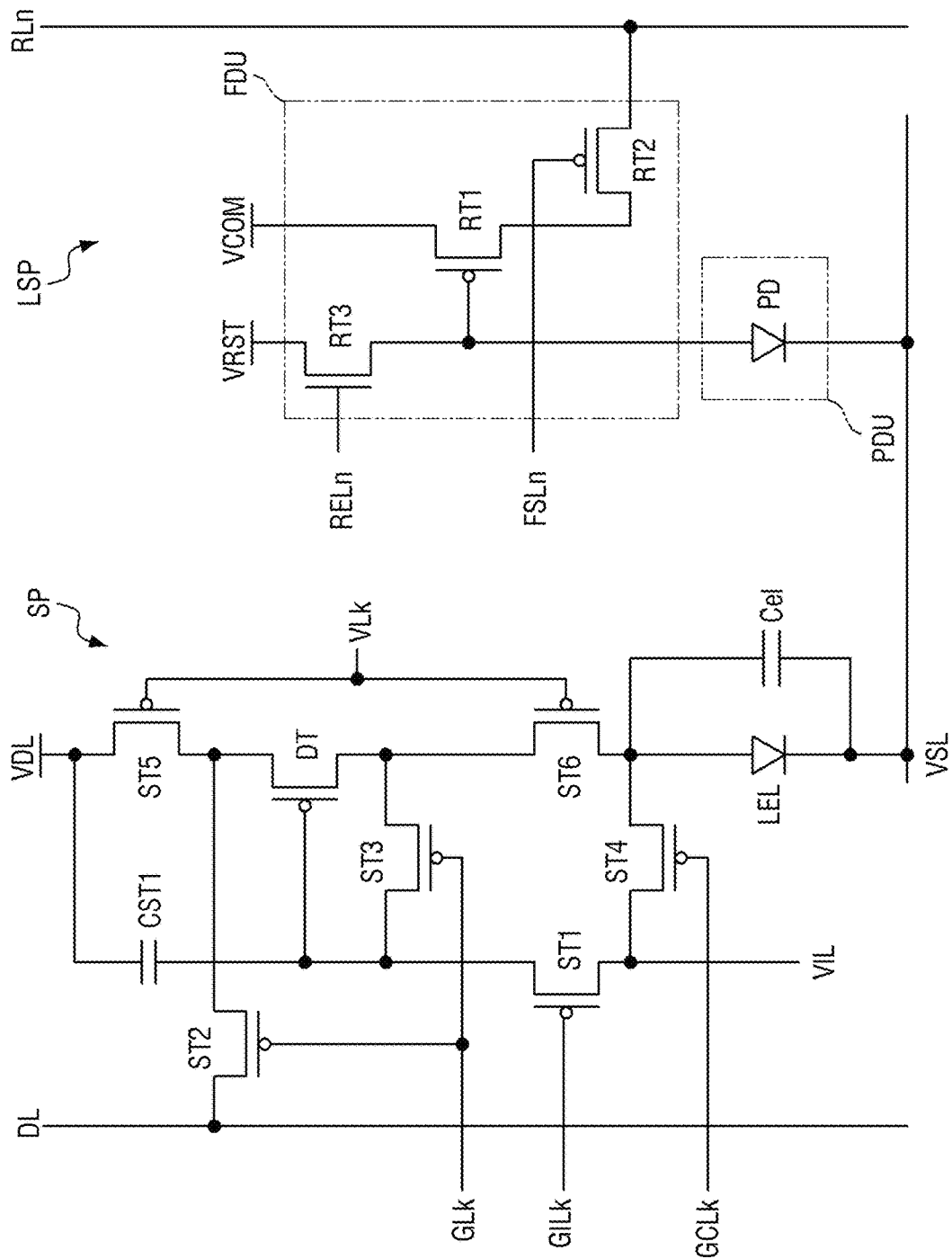
FIG. 7 is a circuit diagram illustrating a display pixel and a light sensing pixel according to an embodiment.

FIG. 7 is a circuit diagram illustrating a display pixel and a light sensing pixel according to an embodiment.

Referring to FIG. 7, each display pixel, according to an embodiment, may be connected to a $k^{th}$ display initialization line GILk, a $k^{th}$ display scan line GLk, a $k^{th}$ display control line GCLk, and a $k^{th}$ emission control line VLk. In addition, the display pixel SP may be connected to a first driving voltage line VDL to which the first driving voltage is supplied, a second driving voltage line VSL to which the second driving voltage is supplied, and a third driving voltage line VIL to which the third driving voltage is supplied. Hereinafter, the alphabet letters k, n and the like used in place of numbers may be positive integers excluding 0 and may be the same number as one another.

The display pixel SP may include a light emitting portion ELU and a pixel driver DDU. The light emitting portion ELU may include a light emitting element LEL. The pixel driver DDU may include a driving transistor DT, switch elements, and a capacitor CST1. The switch elements include the first to sixth transistors ST1, ST2, ST3, ST4, ST5, and ST6.

The driving transistor DT may include a gate electrode, a first electrode, and a second electrode. The driving transistor DT controls a drain-source current Ids (hereinafter, referred to as "driving current") flowing between the first electrode and the second electrode according to a data voltage applied to the gate electrode. The driving current Ids flowing through a channel of the driving transistor DT is proportional to the square of the difference between a threshold voltage and a voltage Vgs between the first electrode and the gate electrode of the driving transistor DT, as shown in Eq. (1).

$$Ids = k' \times (Vsg - Vth)^2 \qquad (1)$$

In Eq. (1), k' is a proportional coefficient determined by the structure and physical characteristics of the driving transistor, Vsg is a voltage between the first electrode and the gate electrode of the driving transistor, and Vth is a threshold voltage of the driving transistor.

The light emitting element LEL emits light by the driving current Ids. As the driving current Ids increases, the amount of light emitted from the light emitting element LEL may increase.

The light emitting element LEL may be an organic light emitting diode including an organic light emitting layer disposed between an anode electrode and a cathode electrode. Alternatively, the light emitting element LEL may be an inorganic light emitting element including an inorganic semiconductor disposed between an anode electrode and a cathode electrode. Alternatively, the light emitting element LEL may be a quantum dot light emitting element including a quantum dot light emitting layer disposed between an anode electrode and a cathode electrode. Alternatively, the light emitting element LEL may be a micro light emitting element including a micro light emitting diode disposed between an anode electrode and a cathode electrode.

The anode electrode of the light emitting element LEL may be connected to a first electrode of the fourth transistor ST4 and a second electrode of the sixth transistor ST6, and the cathode electrode of the light emitting element LEL may be connected to the second driving voltage line VSL. A parasitic capacitance Cel may be formed between the anode electrode and the cathode electrode of the light emitting element LEL.

The first transistor ST1 is turned on by the display initialization signal of the $k^{th}$ display initialization line GILk to connect the gate electrode of the driving transistor DT to the third driving voltage line VIL. Accordingly, the third driving voltage VINT of the third driving voltage line VIL may be applied to the gate electrode of the driving transistor DT. The gate electrode of the first transistor ST1 may be connected to the $k^{th}$ display initialization line GILk, the first electrode thereof may be connected to the gate electrode of the driving transistor DT, and the second electrode thereof may be connected to the third driving voltage line VIL.

The second transistor ST2 is turned on by the display scan signal of the $k^{th}$ display scan line GLk to connect the first electrode of the driving transistor DT to the data line DL. Accordingly, the data voltage of the data line DL may be applied to the first electrode of the driving transistor DT. The gate electrode of the second transistor ST2 may be connected to the $k^{th}$ display scan line GLk, the first electrode thereof may be connected to the first electrode of the driving transistor DT, and the second electrode thereof may be connected to the data line DL.

The third transistor ST3 is turned on by the display scan signal of the $k^{th}$ display scan line GLk to connect the gate electrode of the driving transistor DT to the second electrode thereof. When the gate electrode of the driving transistor DT is connected to the second electrode thereof, the driving transistor DT is driven as a diode. The gate electrode of the third transistor ST3 may be connected to the kai display scan line GLk, the first electrode thereof may be connected to the second electrode of the driving transistor DT, and the second electrode thereof may be connected to the gate electrode of the driving transistor DT.

The fourth transistor ST4 is turned on by the display control signal of the $k^{th}$ display control line GCLk to connect the anode electrode of the light emitting element LEL to the third driving voltage line VIL. The third driving voltage of the third driving voltage line VIL may be applied to the anode electrode of the light emitting element LEL. The gate electrode of the fourth transistor ST4 is connected to the $k^{th}$ display control line GCLk, the first electrode thereof is connected to the anode electrode of the light emitting element LEL, and the second electrode thereof is connected to the third driving voltage line VIL.

The fifth transistor ST5 is turned on by the emission signal of a $k^{th}$ emission control line VLk to connect the first electrode of the driving transistor DT to the first driving voltage line VDL. The gate electrode of the fifth transistor ST5 is connected to the $k^{th}$ emission control line VLk, the first electrode thereof is connected to the first driving voltage line VDL, and the second electrode thereof is connected to the first electrode of the driving transistor DT.

The sixth transistor ST6 is disposed between the second electrode of the driving transistor DT and the anode electrode of the light emitting element LEL. The sixth transistor ST6 is turned on by the emission control signal of the $k^{th}$ emission control line VLk to connect the second electrode of the driving transistor DT to the anode electrode of the light emitting element LEL. The gate electrode of the sixth transistor ST6 is connected to the $k^{th}$ emission control line VLk, the first electrode thereof is connected to the second electrode of the driving transistor DT, and the second electrode thereof is connected to the anode electrode of the light emitting element LEL.

When both the fifth transistor ST5 and the sixth transistor ST6 are turned on, the driving current Ids of the driving transistor DT according to the data voltage applied to the gate electrode of the driving transistor DT may flow to the light emitting element LEL.

The capacitor CST1 is formed between the gate electrode of the driving transistor DT and the first driving voltage line VDL. The first capacitor electrode of the capacitor CST1 may be connected to the gate electrode of the driving transistor DT, and the second capacitor electrode thereof may be connected to the first driving voltage line VDL.

When the first electrode of each of the driving transistor DT and the first to sixth transistors ST1 to ST6 is a source electrode, the second electrode thereof may be a drain electrode. Alternatively, when the first electrode of each of the driving transistor DT and the first to sixth transistors ST1 to ST6 is a drain electrode, the second electrode thereof may be a source electrode.

An active layer of each of the driving transistor DT and the first to sixth transistors ST1 to ST6 may be formed of any one of polysilicon, amorphous silicon, or an oxide semiconductor. In FIG. 7, the first to sixth transistors ST1 to ST6, and the driving transistor DT have been mainly described as being formed of a P-type MOSFET, but the present disclosure is not necessarily limited thereto. For example, the first to sixth transistors ST1 to ST6, and the driving transistor DT may be formed of an N-type MOSFET. Alternatively, at least one of the first to sixth transistors ST1 to ST6 may be formed of an N-type MOSFET.

The light sensing pixels LSP are respectively electrically connected to an $n^{th}$ sensing reset line RELn, an $n^{th}$ light sensing scan line FSLn, and an $n^{th}$ light sensing line RLn. Each of the light sensing pixels LSP may be reset by a reset signal from the $n^{th}$ sensing reset line RELn, and may transmit a light sensing signal to each $n^{th}$ light sensing line RLn in response to the sensing scan signal from the $n^{th}$ light sensing scan line FSLn.

The light sensing pixels LSP may be divided into the light sensing portion PDU including a light sensing element PD, and the sensing driver including first to third sensing transistors RT1 to RT3 and a sensing capacitor. Here, the sensing capacitor may be formed in parallel with the light sensing element PD.

The first sensing transistor RT1 of the sensing driver may allow a light sensing current to flow according to the voltages of the light sensing element PD and the sensing capacitor. The amount of the light sensing current may vary depending on a voltage applied to the light sensing element PD and the sensing capacitor. The gate electrode of the first sensing transistor RT1 may be connected to the second electrode of the light sensing element PD. The first electrode of the first sensing transistor RT1 may be connected to a common voltage source Vcom to which a common voltage is applied. The second electrode of the first sensing transistor RT1 may be connected to the first electrode of the second sensing transistor RT2.

When the sensing scan signal of a gate-on voltage is applied to the $n^{th}$ light sensing scan line FSLn, the second sensing transistor RT2 may allow the sensing current of the first sensing transistor RT1 to flow to the $n^{th}$ light sensing line RLn. In this case, the $n^{th}$ light sensing line RLn may be charged with a sensing voltage by the sensing current. The gate electrode of the second sensing transistor RT2 may be connected to the $n^{th}$ light sensing scan line FSLn, the first electrode thereof may be connected to the second electrode of the first sensing transistor RT1, and the second electrode thereof may be connected to the $n^{th}$ light sensing line RLn.

When a reset signal of the gate-on voltage is applied to the $n^{th}$ sensing reset line RSLn, the third sensing transistor RT3 may reset the voltages of the light sensing element PD and the sensing capacitor to a reset voltage of a reset voltage source VRST. The gate electrode of the third sensing transistor RT3 may be connected to the sensing reset line RSL, the first electrode thereof may be connected to the reset voltage source VRST, and the second electrode thereof may be connected to the second electrode of the light sensing element PD.

It is illustrated in FIG. 7 that the first sensing transistor RT1 and the second sensing transistor RT2 are formed of a P-type metal oxide semiconductor field effect transistor (MOSFET), and the third sensing transistor RT3 is formed of an N-type MOSFET. However, an embodiment of the present disclosure is not necessarily limited thereto, and they may be selectively formed in the same type or different types. Further, any one of the first electrode and the second electrode of each of the first sensing transistor RT1, the second sensing transistor RT2, and the third sensing transistor RT3 may the source electrode and the other one may be the drain electrode.

Figure 8:
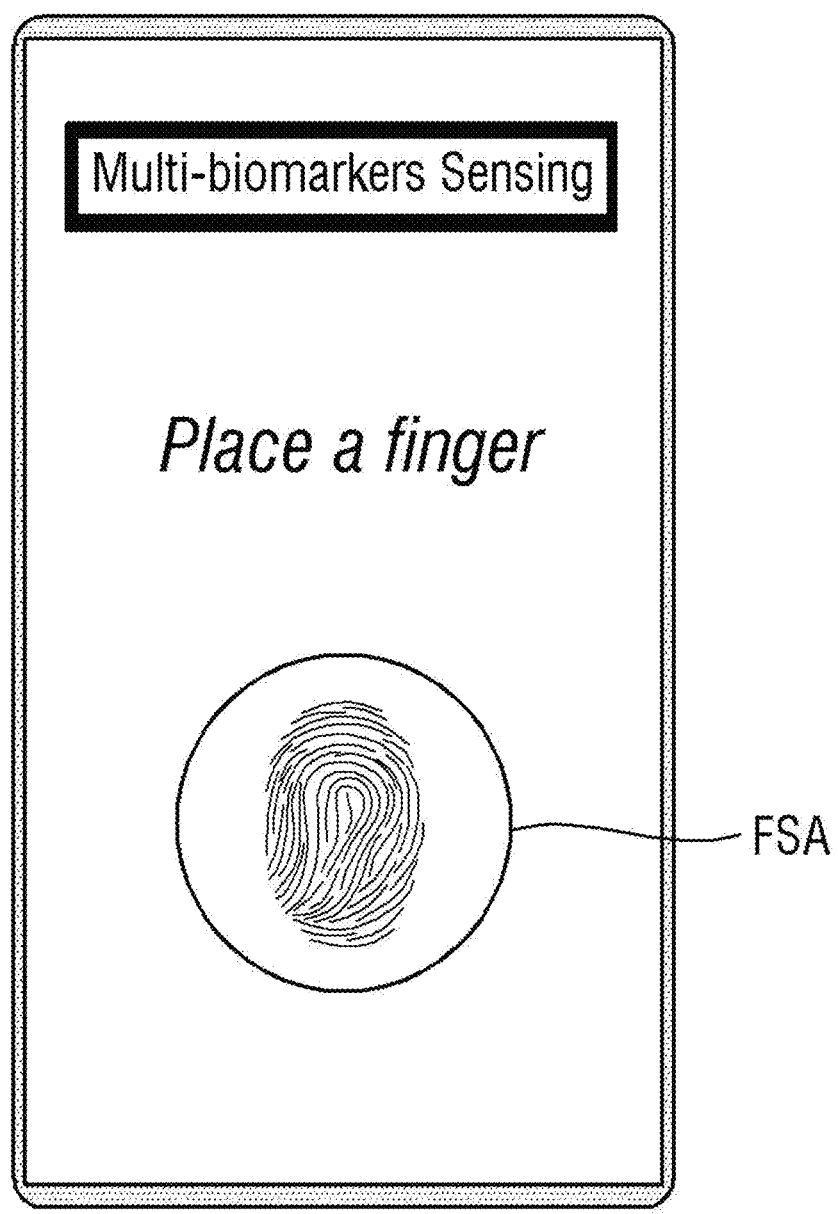
FIG. 8 is a diagram showing an image display screen and a body part touch area detection process during a biometric information measurement period.

FIG. 8 is a diagram showing an image display screen and a body part touch area detection process during a biometric information measurement period.

Referring to FIG. 8, during the biometric information detection period, the main driving circuit 200 supplies the data voltage to the first and second unit pixels PG1 and PG2 of the display panel 100, and supplies the control signals to the display scan driver 110 and the light sensing scan driver 120 to display a preset guide screen for pulse wave signal detection in the display area DA.

The main driving circuit 200 displays the biometric information measurement area FSA where a touch of a body part, such as a finger F or the like, is sensed on the guide screen for a pulse wave detection, and guide the pulse wave signal detection process. At this time, the main driving circuit 200 displays a period required for biometric information measurement, a pulse wave signal detection period, and the biometric information measurement area FSA in the form of a circular or bar graph on the application program screen.

For example, during the biometric information detection period, the main driving circuit 200 receives touch position coordinates sensed by the touch sensing unit TSU or the pressure sensing unit PSU using the touch driving circuit 400. Then, the main driving circuit 200 supplies the data voltage to the first and second unit pixels PG1 and PG2 arranged at the portion of the biometric information measurement area FSA that is touched by the finger F, and supplies the control signals to the display scan driver 110 and the light sensing scan driver 120. At this time, the main driving circuit 200 may supply a preset data voltage to at least one of the first and second display pixels SP1 and SP2 included in the first and second unit pixels PG1 and PG2, so that an optical signal may be detected by at least one of the green light or the red light. Thereafter, the main driving circuit 200 receives the optical signals, for example, the light sensing signals, from the light sensing pixels LSP through the light sensing lines ERL of the display panel 100.

The main driving circuit 200 detects the pulse wave signals (PPG signals) corresponding to the light sensing signals received in real time and stores them as digital signal data. The pulse wave signals are signals corresponding to the magnitudes of the light sensing signals and the change in the magnitudes thereof.

Figure 9:
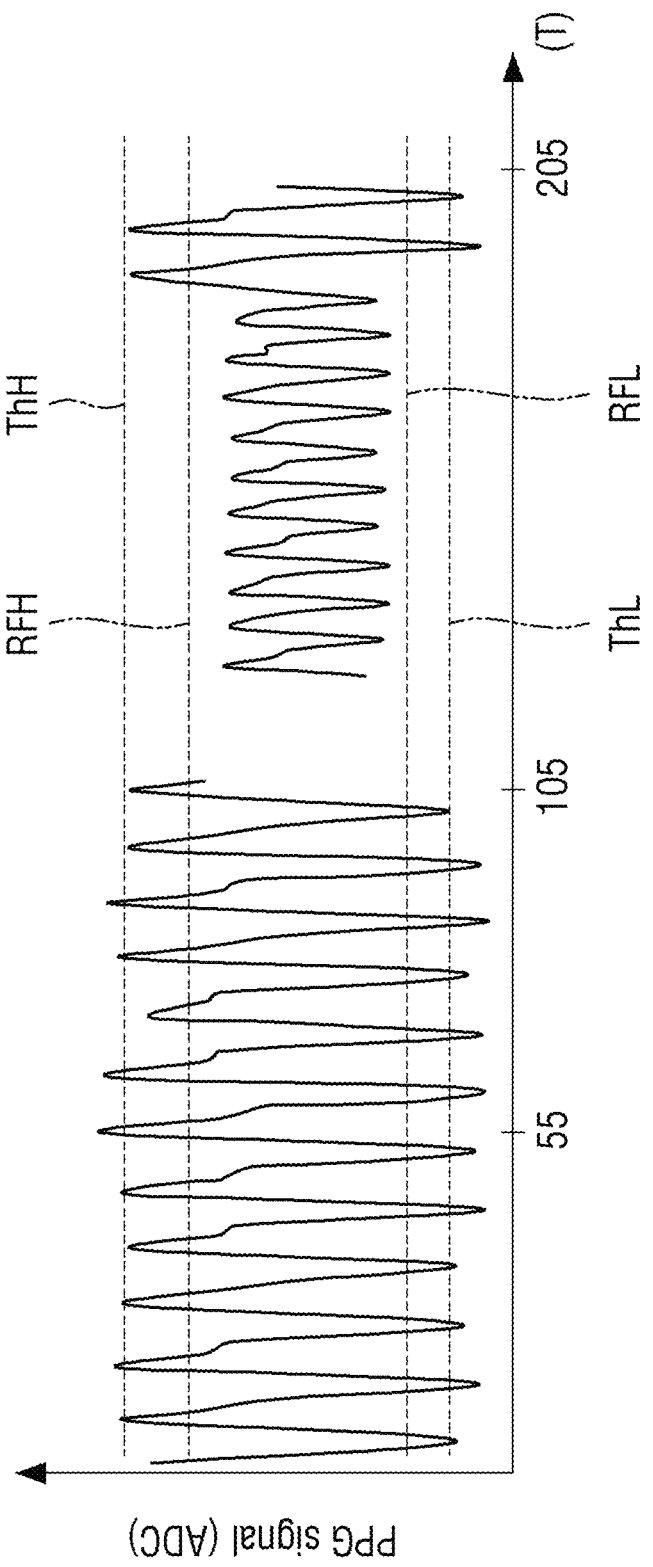
FIG. 9 is a graph showing a pulse wave signal detected in real time during a biometric information measurement period and an inaccurate pulse wave signal detection process.

FIG. 9 is a graph showing a pulse wave signal detected in real time during a biometric information measurement period and an inaccurate pulse wave signal detection process.

Referring to FIG. 9, the main driving circuit 200 performs preset signal processing processes for light sensing signals, such as amplification, filtering, and sampling of the light sensing signals detected by the light sensing pixels LSP of a position where a body part, such as the finger F or the like, is touched. Then, the pulse wave signals PPG corresponding to the magnitudes of the signal-processed light sensing signals and the change in the magnitudes thereof are generated.

The main driving circuit 200 analyzes the high pulse magnitude change and the low pulse magnitude change of the pulse wave signals PPG generated in real time, and calculates an average magnitude value RFH of high pulses and an average magnitude value RFL of low pulses in real time. Then, the main driving circuit 200 sets a normal pulse wave signal detection period or an inaccurate pulse wave signal detection period in real time according to the comparison analysis result of the average magnitude value RFH of high pulses and a preset high threshold ThH and the average magnitude value RFL of low pulses and a preset low threshold ThL.

For example, the main driving circuit 200 sets the normal pulse wave signal detection period when the average magnitude value RFH of high pulses is detected to be greater than or equal to the preset high threshold ThH during a plurality of preset frame periods. Further, the main driving circuit 200 may set the normal pulse wave signal detection period when the average magnitude value RFL of low pulses is detected to be greater than the preset low threshold ThL during a plurality of preset frame periods.

Alternatively, the main driving circuit 200 sets the inaccurate pulse wave signal detection period in real time when a period in which pulse wave signals PPG generated in real time are interrupted is detected. In addition, the main driving circuit 200 sets the inaccurate pulse wave signal detection period when the average magnitude value RFH of high pulses is detected to be smaller than the preset high threshold ThH during a plurality of preset frame periods. Further, the main driving circuit 200 may set the inaccurate pulse wave signal detection period when the average magnitude value RFL of low pulses is detected to be smaller than the preset low threshold ThL during a plurality of preset frame periods.

Figure 10:
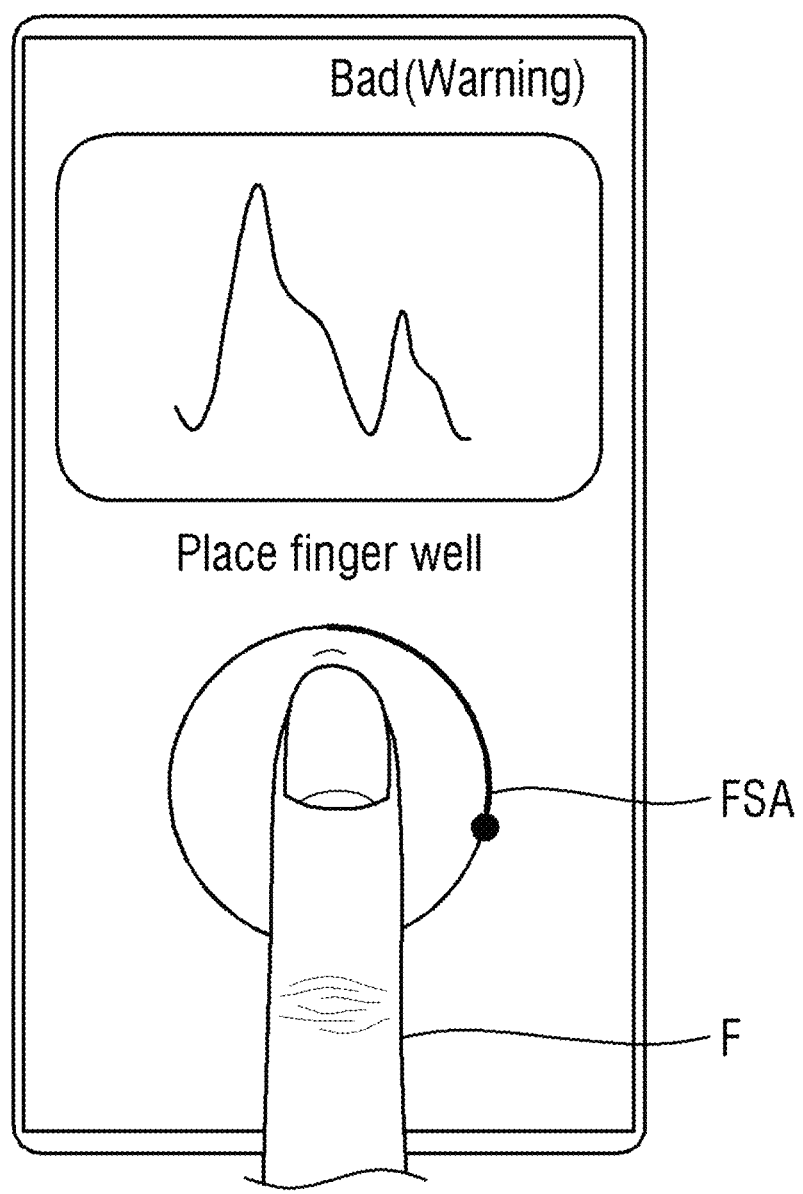
FIG. 10 is a diagram showing an image display screen shown when an inaccurate pulse wave signal is detected during a biometric information measurement period.

FIG. 10 is a diagram showing an image display screen shown when an inaccurate pulse wave signal is detected during a biometric information measurement period.

As shown in FIG. 10, the main driving circuit 200 may display waveforms of pulse wave signals detected in real time on the display window of the application program as a graphic screen so that the user can check the pulse wave signal detected in real time during an inaccurate pulse wave signal detection period.

The main driving circuit 200 displays a touch guide message on the application program screen so that a body part, such as the finger F or the like, may be accurately touched and the touch state may be maintained during the inaccurate pulse wave signal detection period. In this case, the pulse wave signal and touch guide message displayed in real time may be changed to the warning color such as red and be displayed.

Figure 11:
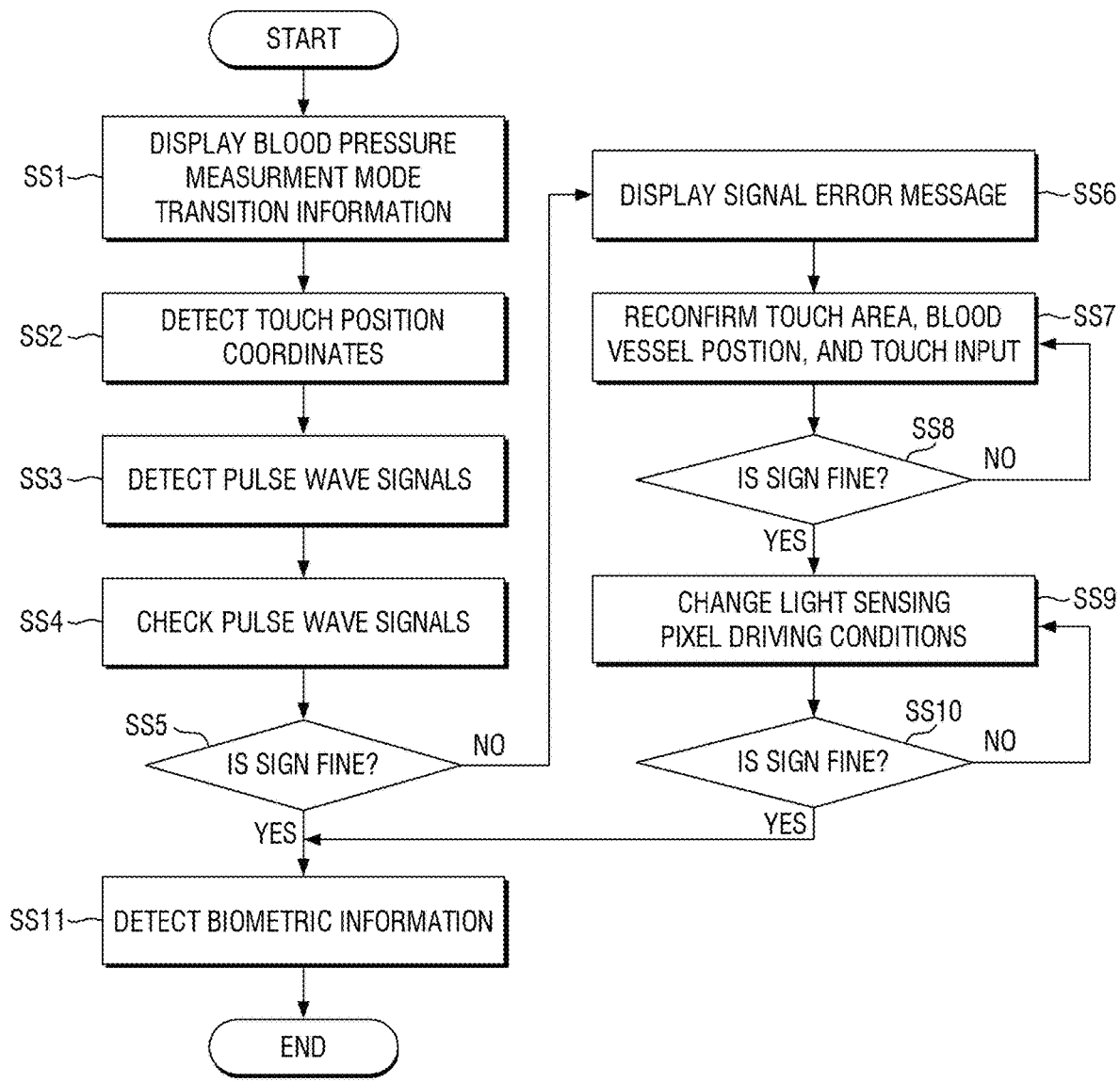
FIG. 11 is a flowchart illustrating a method of measuring biometric information according to an embodiment of the present disclosure.

FIG. 11 is a flowchart illustrating a method of measuring biometric information according to an embodiment of the present disclosure.

Referring to FIG. 11, during the period of detecting biometric information, the main driving circuit 200 displays the biometric information measurement area FSA of a body part such as a finger F as a guide screen for detecting the pulse wave signal, and guides the pulse wave signal detection process (Step SS1).

The main driving circuit 200 receives the touch position coordinates detected through the touch sensing unit TSU or pressure sensing unit PSU through the touch driving circuit 400 (Step SS2).

The main driving circuit 200 supplies data voltage to the first and second unit pixels PG1 and PG2 arranged at the finger F touch position in the biometric information measurement area FSA, and supplies control signals to the display scan driver 110 and the light sensing scan driver 120. The main driving circuit 200 may supply a preset data voltage to at least one display pixel among the first and second display pixels SP1 and SP2 included in the first and second unit pixels PG1 and PG2, enabling an optical signal to be detected by at least one of green light and red light. Then, the main driving circuit 200 receives optical signals, for example, light sensing signals, from each light sensing pixel LSP through the light sensing lines ERL of the display panel 100. The main driving circuit 200 detects pulse wave signals (PPG signals) corresponding to the light sensing signals received in real time (Step SS3).

Figure 12:
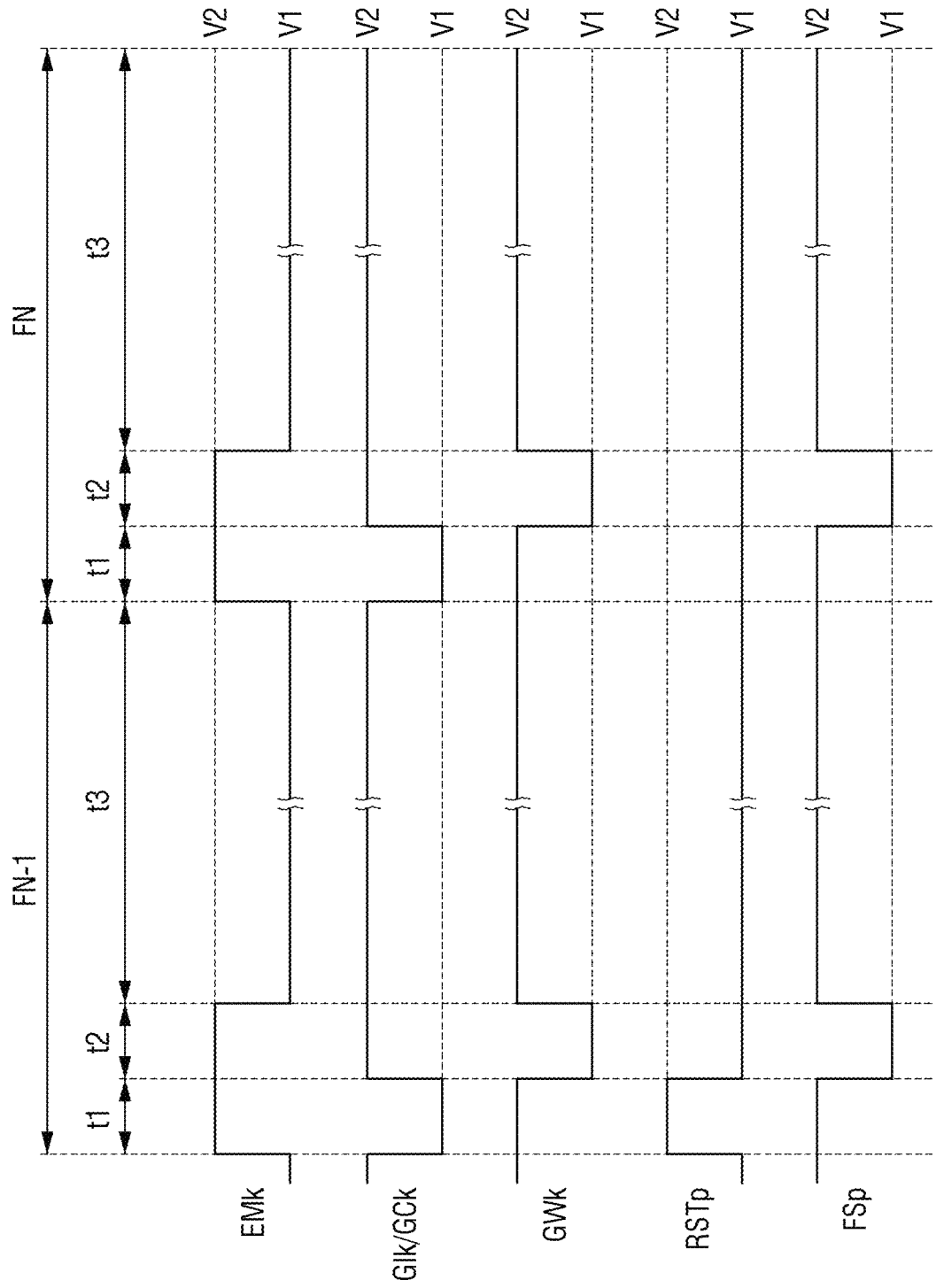
FIG. 12 is a waveform diagram illustrating a sensing scan signal and a reset signal inputted to a first display pixel of a display pixel and a light sensing pixel according to an embodiment.

FIG. 12 is a waveform diagram illustrating a sensing scan signal and a reset signal inputted to a first display pixel of a display pixel and a light sensing pixel according to an embodiment.

FIG. 12 illustrates a $k^{th}$ display emission signal EMk applied to the $k^{th}$ emission line VLk, a $k^{th}$ display initialization signal GIk applied to the $k^{th}$ display initialization line GILk, a $k^{th}$ display control signal GCk applied to the $k^{th}$ display control line GCLk, a $k^{th}$ display scan signal GWk applied to the $k^{th}$ display write line GLk, a $p^{th}$ reset signal RSTp applied to the $n^{th}$ sensing reset line RELn, and a $p^{th}$ sensing scan signal FSp applied to the $n^{th}$ light sensing scan line FSLn during an $(N-1)^{th}$ frame period FN-1 and an $N^{th}$ frame period FN among the period in which biometric information is detected and measured, for example, the biometric information measurement period.

The $p^{th}$ reset signal RSTp applied to the $n^{th}$ sensing reset line RELn controls on-off of the third sensing transistor RT3, and the $p^{th}$ sensing scan signal FSp applied to the $n^{th}$ light sensing scan line FSLn controls on-off of the second sensing transistor RT2.

The $p^{th}$ reset signal RSTp is generated as a second level voltage V2 during the first period t1 and is generated as a first level voltage V1 during the second period t2 and the third period t3. In addition, the $p^{th}$ sensing scan signal FSp is generated as a first level voltage V1 during the first period t1, and as a second level voltage V2 during the second period t2 and the third period t3. The $p^{th}$ sensing scan signal FSp may be applied at the same timing as the $k^{th}$ display scan signal GWk. A light sensing signal of the light sensing element PD may be output in response to the $p^{th}$ sensing scan signal FSp.

During the first period t1, the $p^{th}$ reset signal RSTp of the second level voltage V2 is supplied to the gate electrode of the third sensing transistor RT3. Accordingly, the third sensing transistor RT3 is turned on by the $p^{th}$ reset signal RSTp of the second level voltage V2, thereby resetting the second electrode of the light sensing element PD into a reset voltage source VRST. The $p^{th}$ sensing scan signal FSp having the second level voltage V2 is supplied to the gate electrode of the second sensing transistor RT2. The second sensing transistor RT2 is turned off by the $p^{th}$ sensing scan signal FSp having the second level voltage V2.

During the second period t2 and the third period t3, the $p^{th}$ reset signal RSTp of the first level voltage V1 is supplied to the gate electrode of the third sensing transistor RT3. Accordingly, the third sensing transistor RT3 maintains the turned-off state. During the second period t2, the $p^{th}$ sensing scan signal FSp of the first level voltage V1 is supplied to the gate electrode of the second sensing transistor RT2. Accordingly, the second sensing transistor RT2 may be turned on during the second period t2, and the third sensing transistor RT3 may be turned off during the second period t2 and the third period t3. For example, the voltage of the sensing anode electrode of the light sensing element PD may increase according to the light incident from the front during the third period t3. At this time, the main driving circuit 200 receives optical signals, for example, light sensing signals, from each of the light sensing pixels LSP through the light sensing lines ERL of the display panel 100 during the third period t3. The main driving circuit 200 detects pulse wave signals (PPG signals) corresponding to the light sensing signals received in real time (Step SS3).

The main driving circuit 200 analyzes the high pulse magnitude change and the low pulse magnitude change of the pulse wave signals PPG generated in real time, and calculates an average magnitude value RFH of high pulses and an average magnitude value RFL of low pulses in real time. Then, the main driving circuit 200 sets a normal pulse wave signal detection period or an inaccurate pulse wave signal detection period in real time according to the comparison analysis result of the average magnitude value RFH of high pulses and a preset high threshold ThH and the average magnitude value RFL of low pulses and a preset low threshold ThL. The main driving circuit 200 sets an inaccurate pulse wave signal detection period in real time when a period in which pulse wave signals PPG generated in real time are interrupted is detected. The main driving circuit 200 sets an inaccurate pulse wave signal detection period in real time when the average magnitude value RFH of high pulses is detected to be lower than the preset high threshold ThH, or when the average magnitude value RFL of low pulses is detected to be lower than the preset low threshold ThL (Step SS5).

The main driving circuit 200 displays a touch guide message on the application program screen so that a body part, such as the finger F or the like, may be accurately touched and the touch state may be guided during the inaccurate pulse wave signal detection period (Step SS6).

Figure 13:
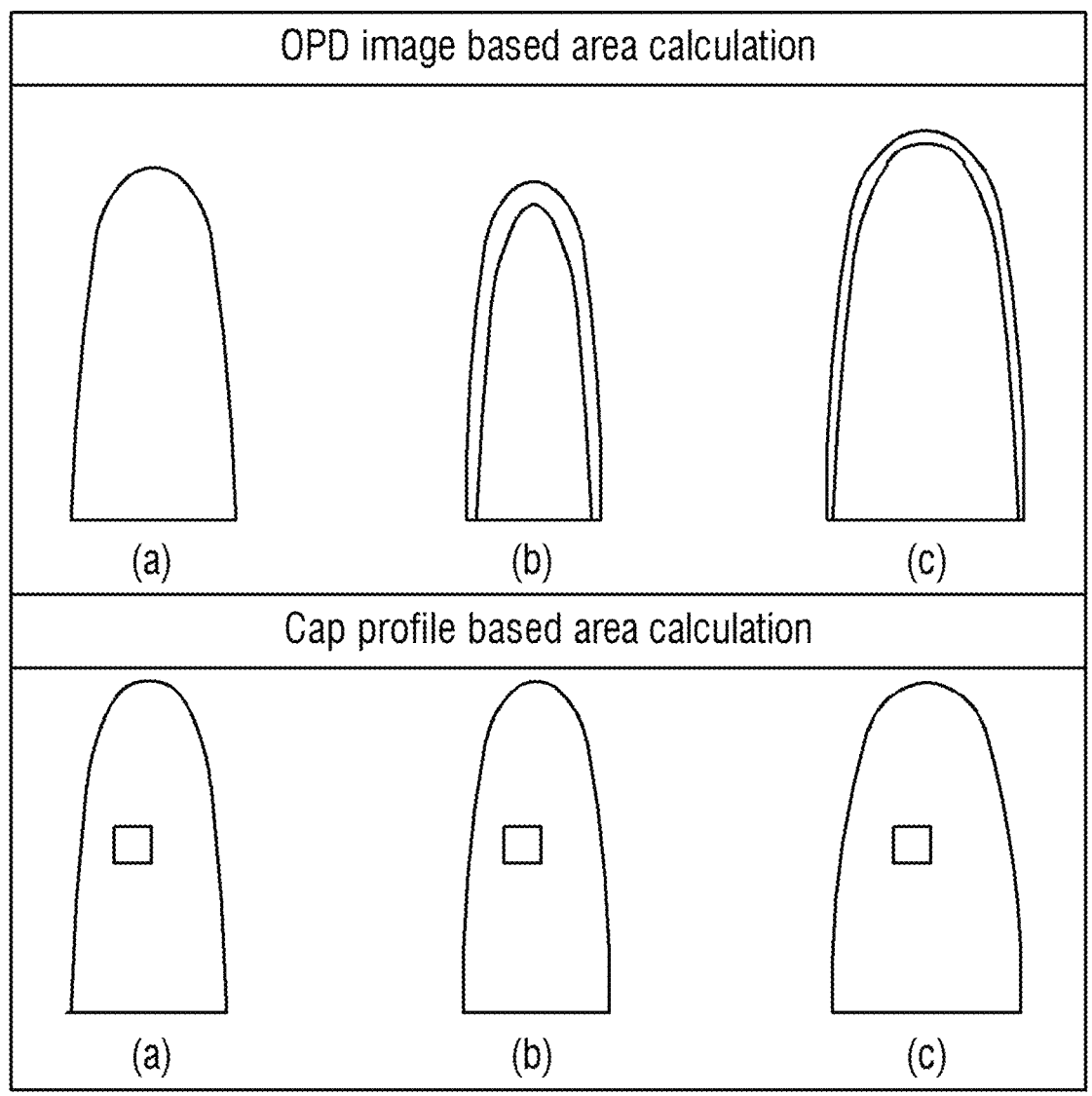
FIG. 13 is an image diagram showing a state in which a pulse wave signal is inaccurately detected during a biometric information measurement period.

FIG. 13 is an image diagram showing a state in which a pulse wave signal is inaccurately detected during a biometric information measurement period.

Referring to FIG. 13, the main driving circuit 200 performs preset signal processing processes on light sensing signals detected by the light sensing pixels LSP of a position where a body part, such as the finger F or the like, is touched. Further, the main driving circuit 200 generates an image (OPD image) based on the light sensing signal value and the arrangement position of the light sensing pixels LSP which outputted light sensing signals detected by the light sensing pixels LSP. Then, a touch area or a touch shape is analyzed based on the signal values, the arrangement positions thereof, the image and the likes detected by the light sensing pixels LSP.

As illustrated in the images "(b)" in FIG. 13 among images "(a)", "(b)", and "(c)", when the touch area becomes smaller than a preset reference area, it can be determined to be the cause of inaccurate pulse wave signal detection. Accordingly, the main driving circuit 200 may repetitively display a touch guide message on the application program screen so that a body part, such as the finger F or the like, may be accurately touched and the touch state may be guided during the inaccurate pulse wave signal detection period, thereby guiding the body part touch area to become wider (Step SS7).

Alternatively, the main driving circuit 200 may generate a capacitance (Cap) profile for signal values based on the signal values detected by the light sensing pixels LSP. Further, the main driving circuit 200 analyzes the touch area or the touch shape based on the signal values, the arrangement position of the light sensing pixels LSP which outputted light sensing signals, and the image detected by the light sensing pixels LSP. Then, the touch area or the touch shape is analyzed based on the capacitance (Cap) profile detected by the light sensing pixels LSP.

As illustrated in image in FIG. 13, images "(b)", when the touch area becomes smaller than the reference area, the inaccurate pulse wave signal detection period may be set. Similarly, the main driving circuit 200 may further display a touch guide message on the application program screen so that a body part, such as the finger F or the like, may be accurately touched and the touch state may be guided during the inaccurate pulse wave signal detection period, thereby guiding the body part touch area to become wider (Step SS7).

Figure 14:
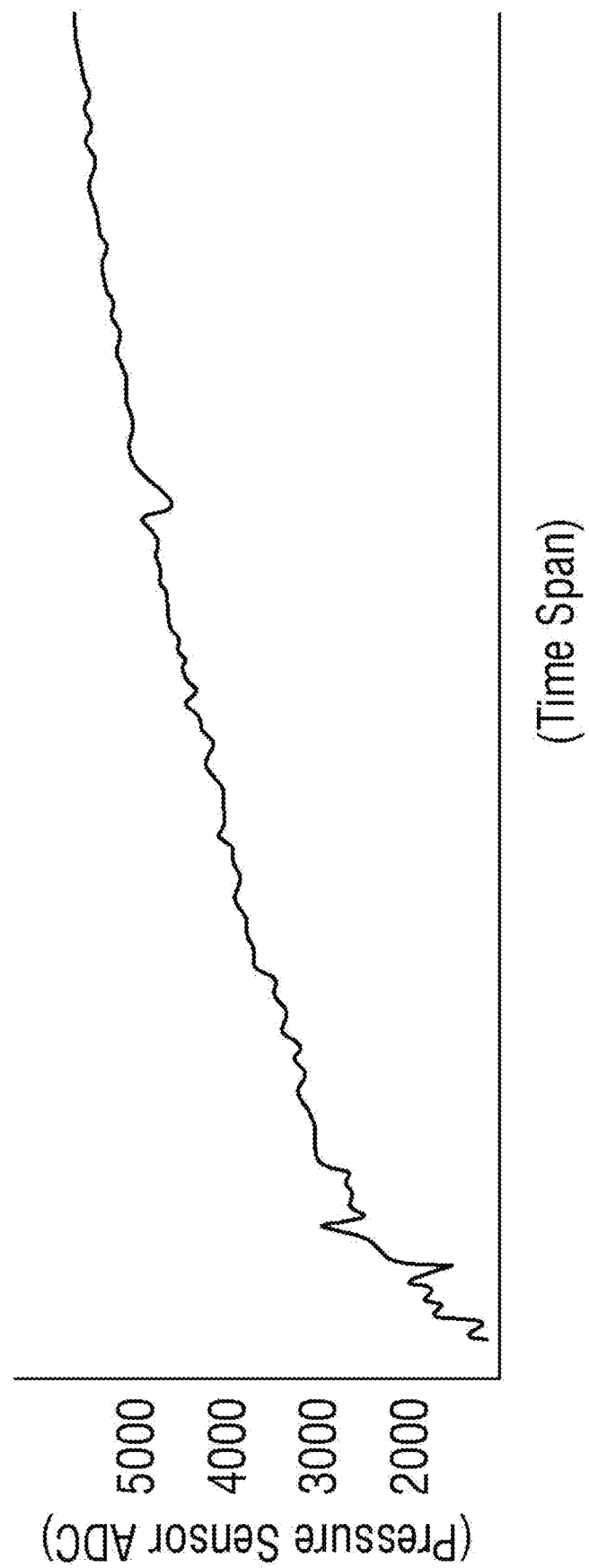
FIG. 14 is a waveform diagram showing the change in pressing force measured in real time during the biometric information measurement period.

FIG. 14 is a waveform diagram showing the change in pressing force measured in real time during the biometric information measurement period.

Referring to FIG. 14, the touch driving circuit 400 supplies a reference voltage to the lower electrodes of the pressure sensing unit PSU, and receive pressure sensing signals from the upper electrodes thereof, thereby sensing the changes in the self-capacitance of the pressed areas using the pressure sensing signals. Accordingly, the touch driving circuit 400 generates pressure data according to the amount of change in the self-capacitance of the area pressed by the body part and sensing coordinate data of a position where a touch is sensed and supply the generated data to the main driving circuit 200.

The main driving circuit 200 analyzes touch pressure and touch shape based on pressure data and detection coordinate data of the pressure-sensed position. When the touch pressure decreases below a preset reference pressure or the touch area according to the touch shape becomes smaller than the reference area, the main driving circuit 200 determines this as the cause of inaccurate pulse wave signal detection. Accordingly, the main driving circuit 200 displays a pressure guide message on the application program screen so that the touch state of the body part, such as the finger F, can be accurately touched and pressed stronger than the reference pressure during the inaccurate pulse wave signal detection period, thereby guiding the body part touch area to become wider (Step SS7).

Even after the touch guide message or the pressure guide message is displayed on the application program screen, the main driving circuit 200 analyzes the pulse magnitude change of the pulse wave signals PPG generated in real time to determine whether a normal pulse wave signal is detected or an inaccurate pulse wave signal is detected (Step SS8).

When the inaccurate pulse wave signal detection period is set and maintained even after the touch guide message or the pressure guide message is displayed on the application program screen, the main driving circuit 200 increases the voltage magnitude of data voltage in preset steps to increase the light emitting luminance of the display pixels SP and the infrared light emitting pixels and supply it to the data line DL of the display pixels SP and the infrared light emitting pixels. For example, the main driving circuit 200 may increase the data voltage by 0.1V to 0.5V in at least one frame unit and supply it to the data lines DL of the display pixels SP and the infrared light-emitting pixels (Step SS9).

Figure 15:
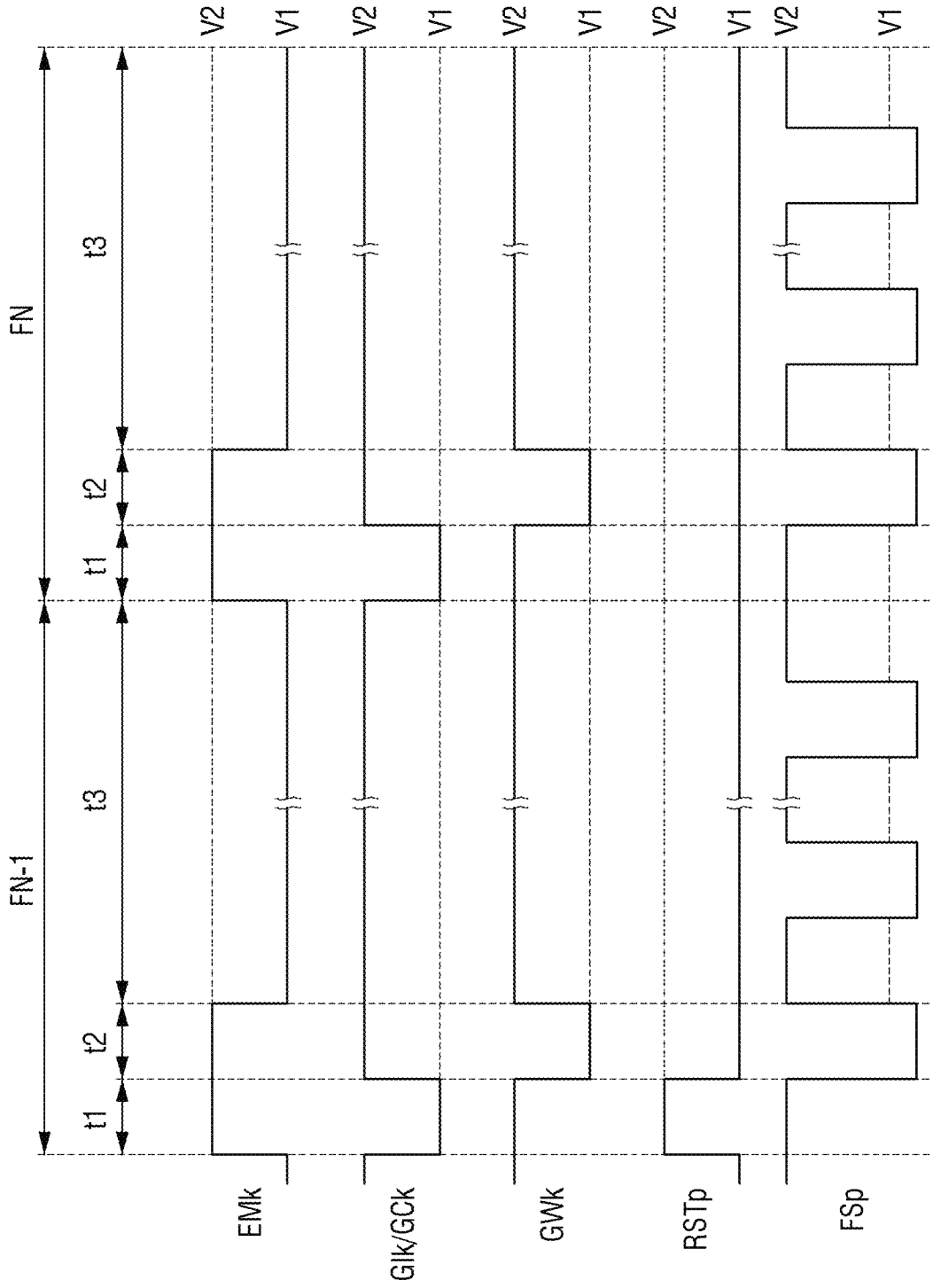
FIG. 15 is a waveform diagram of an embodiment showing a modified example of the sensing signal and the reset signal inputted to a first display pixel and the light sensing pixel of the display pixel.

FIG. 15 is a waveform diagram of an embodiment showing a modified example of the sensing signal and the reset signal inputted to a first display pixel and the light sensing pixel of the display pixel.

Referring to FIG. 15, during the inaccurate pulse wave signal detection period, the main driving circuit 200 increases the number of detections of the light sensing pixels LSP in order to gradually increase the number of detections (or detection timing) of the light sensing signals in steps at least in units of one frame period.

For example, in order to increase the turn-on number of the second sensing transistor RT2 of the light sensing pixels LSP during at least one frame period, the main driving circuit 200 increases the number of supplying the p$^{th}$ sensing scan signal FSp generated as the first level voltage V1 (turn-on voltage) during the second period t2 and the third period t3 of each frame period and supply the p$^{th}$ sensing scan signal FSp to the light sensing scan lines FSLn.

The main driving circuit 200 may increase the number of supplying the p$^{th}$ sensing scan signal FSp generated by the first level voltage V1 (turn-on voltage) to 2, 3, 4, 5 . . . or more in order to increase the number of light detections of the light sensing pixels LSP at least in units of one frame period, and supply the p$^{th}$ sensing scan signal FSp to the light sensing scan lines FSLn (Step SS9).

In addition, during the inaccurate pulse wave signal detection period, the main driving circuit 200 increases and supplies the voltage magnitude of the sensing scan signals FSp that turn on the second sensing transistors RT2 of the light sensing pixels LSP in steps in order to change the driving voltage conditions of the light sensing pixels LSPs step by step at least in units of one frame period.

For example, the main driving circuit 200 may increase the voltage level of the p$^{th}$ sensing scan signal FSp by 0.1 V to 0.5 V at least in units of one frame and supply the p$^{th}$ sensing scan signal FSp to the light sensing scan lines FSLn so that the voltage magnitude of the sensing scan signals FSp that turn on the second sensing transistor RT2 of the light sensing pixels LSP is increased at least in units of one frame period. At this time, the voltage level of the p$^{th}$ sensing scan signal FSp may increase by 0.1 V to 0.5 V at least in units of one frame to be greater than the first level voltage V1 (turn-on voltage) and be supplied to the light sensing scan lines FSLn (Step SS9).

Even in the process of changing the driving conditions of the light sensing pixels LSP, the main driving circuit 200 analyzes the pulse magnitude change of the pulse wave signals PPG generated in real time to confirm whether a normal pulse wave signal is detected or an inaccurate pulse wave signal is detected (Step SS10).

Figure 16:
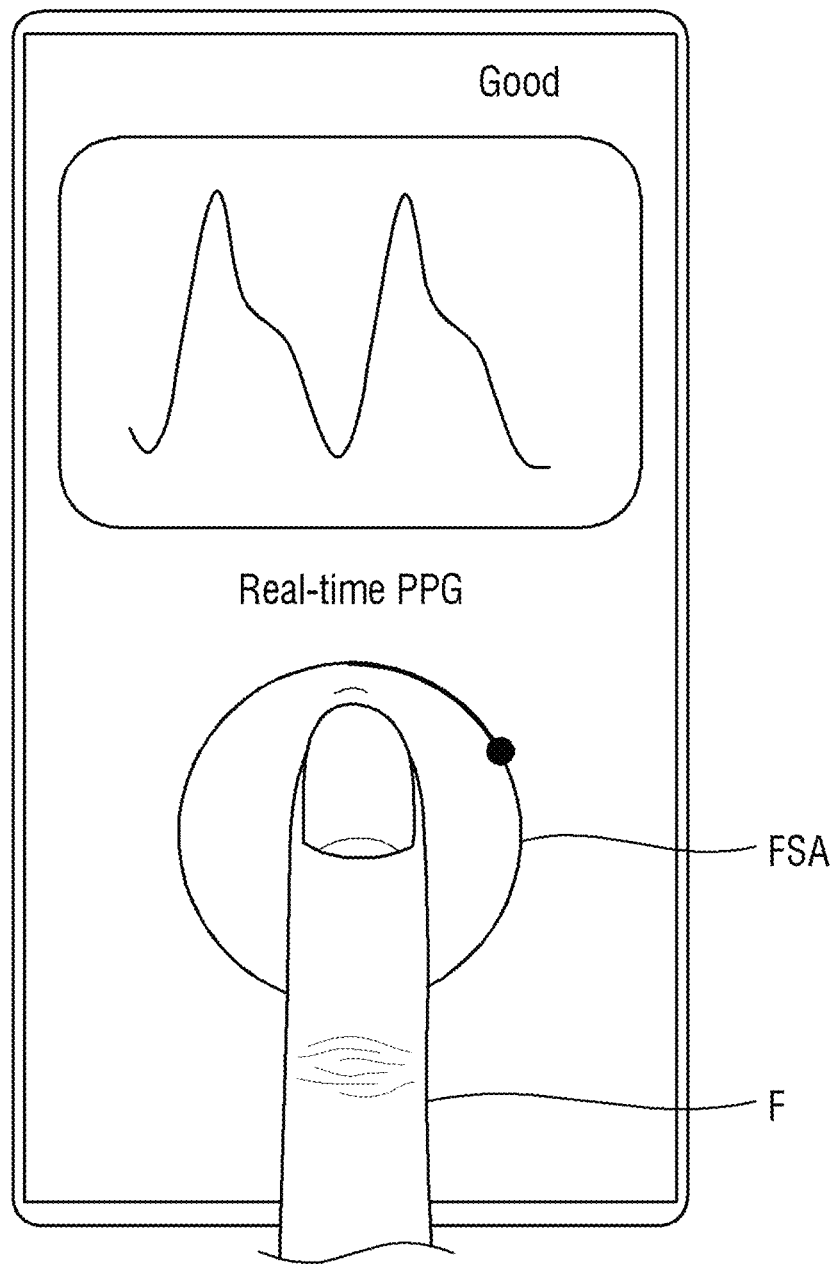
FIG. 16 is a diagram showing an image display screen which shows an accurate pulse wave signal detection state through a mobile display device.
Figure 17:
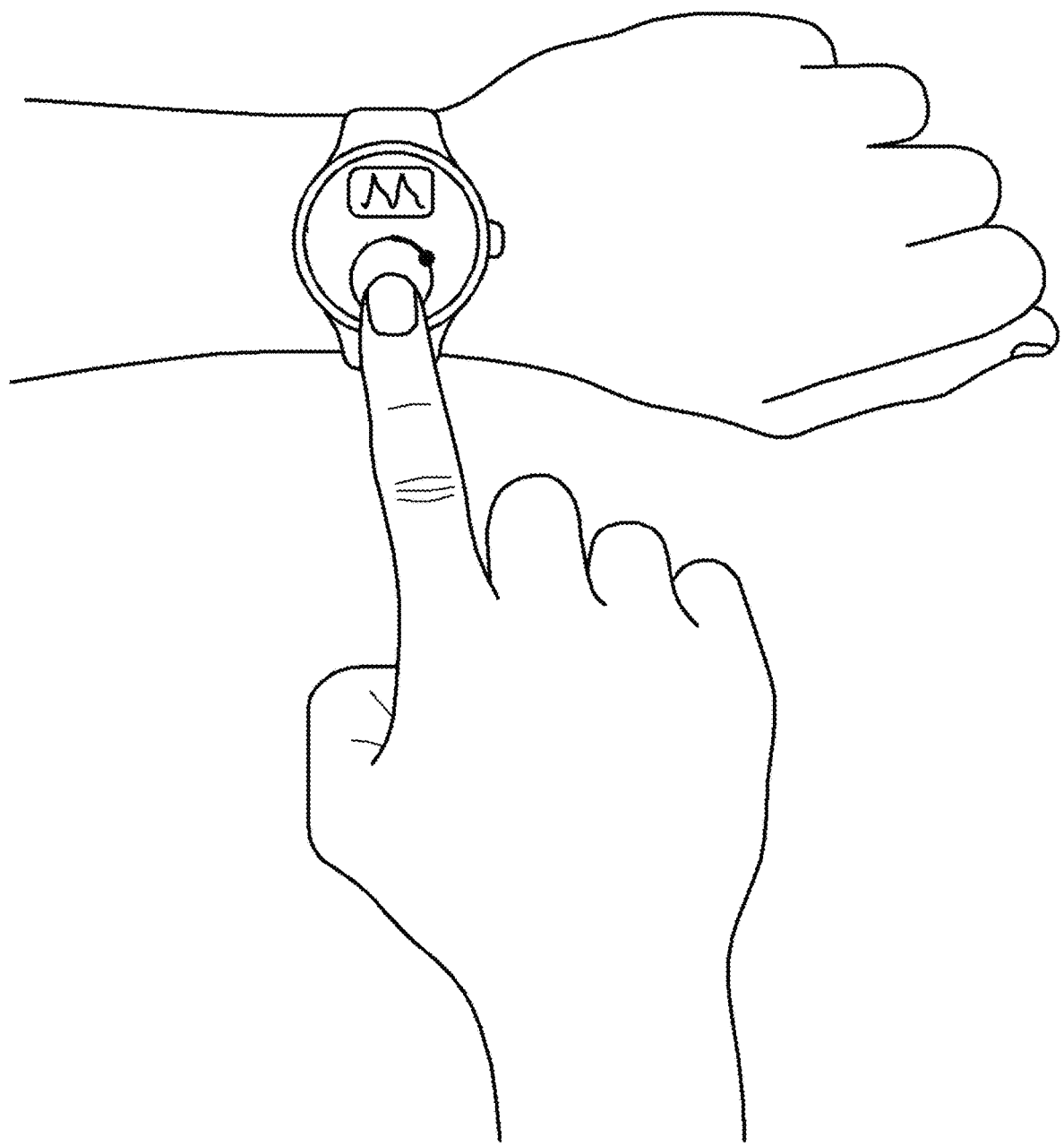
FIG. 17 is a diagram showing an image display screen which shows an accurate pulse wave signal detection state through a watch-type display device.

FIG. 16 is a diagram showing an image display screen which shows an accurate pulse wave signal detection state through a mobile display device. FIG. 17 is a diagram showing an image display screen which shows an accurate pulse wave signal detection state through a watch-type display device.

Referring to FIGS. 16 and 17, during the period for detecting biometric information according to normal pulse wave signal detection, the main driving circuit 200 displays the period required for measuring biometric information, the pulse wave signal detection period, and biometric information measurement area FSA and the likes in the form of circular or bar graph through the application program screen (Step SS11).

When the normal pulse wave signal detection period is set according to the detection result of the average magnitude value RFH of high pulses and the average magnitude value RFL of low pulses, the main driving circuit 200 displays the normal touch guide message on the application program screen so that the normal touch state may be maintained. At this time, the pulse wave signal and the touch guide message displayed in real time may be changed and displayed as a normal progress color such as green, blue, or the like.

The main driving circuit 200 receives touch position coordinates sensed by the touch sensing unit TSU or the pressure sensing unit PSU using the touch driving circuit 400. Then, the main driving circuit 200 supplies the data voltage to the first and second unit pixels PG1 and PG2 arranged at the portion of the biometric information measurement area FSA that is touched by the finger F, and supplies the control signals to the display scan driver 110 and the light sensing scan driver 120. At this time, the main driving circuit 200 may supply a preset data voltage to at least one display pixel among the first and second display pixels SP1 and SP2 included in the first and second unit pixels PG1 and PG2, enabling an optical signal to be detected by at least one of green light and red light. Thereafter, the main driving circuit 200 receives the optical signals, for example, the light sensing signals, from the light sensing pixels LSP through the light sensing lines ERL of the display panel 100.

The main driving circuit 200 detects the pulse wave signals (PPG signals) corresponding to the light sensing signals received in real time and stores them as digital signal data. The pulse wave signals are signals corresponding to the magnitudes of the light sensing signals and the change in the magnitudes thereof. The main driving circuit 200 displays the pulse wave signals detected in real time on a display window of the application program screen in a graphic form of a graph type.

Figure 18:
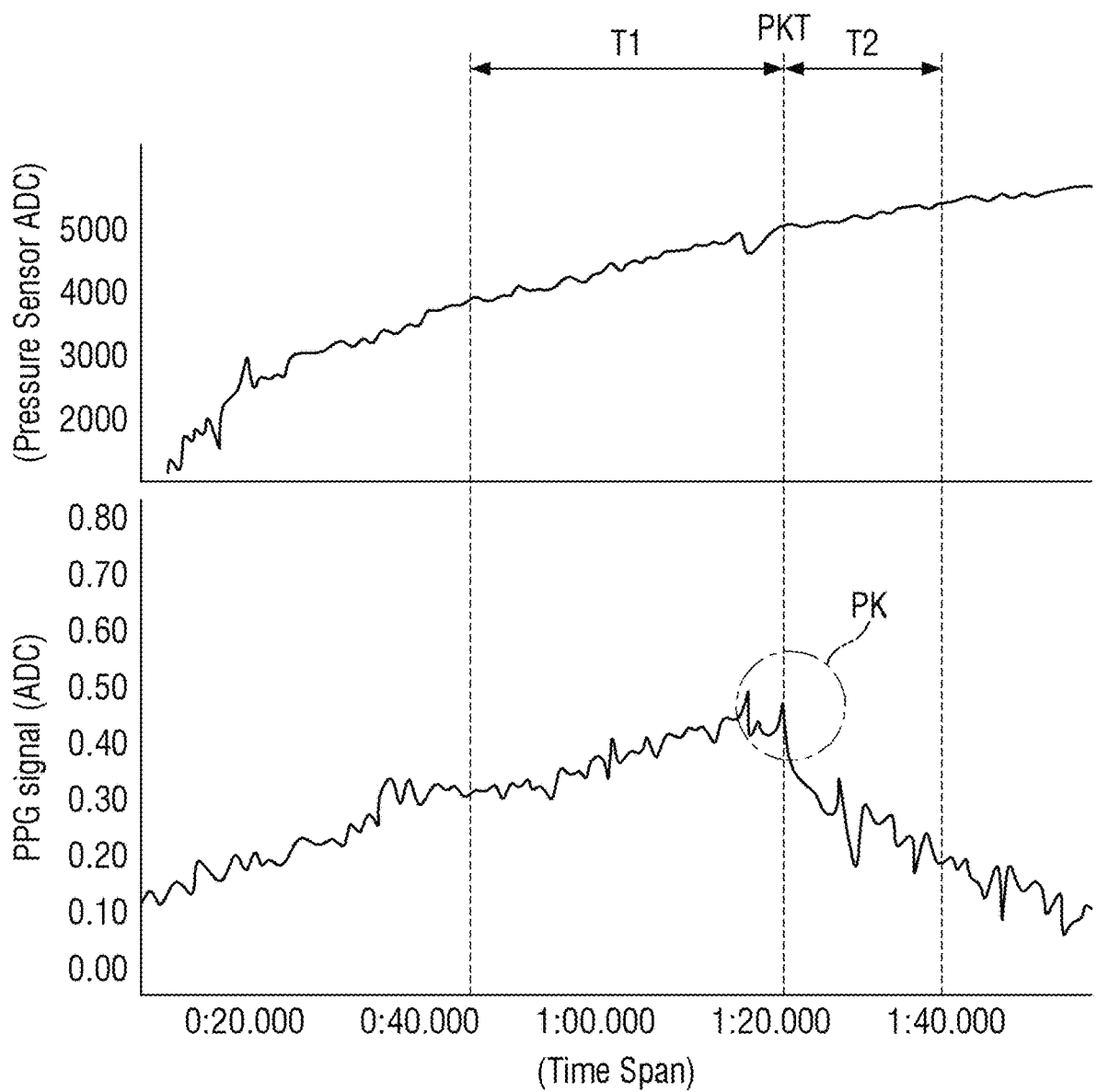
FIG. 18 is a graph illustrating a method for calculating blood pressure information among biometric information according to an embodiment.

FIG. 18 is a graph illustrating a method for calculating blood pressure information among biometric information according to an embodiment.

Referring to FIG. 18, during the systole of the heart, the blood ejected from the left ventricle of the heart moves to the peripheral tissues, and thus the blood volume in the arterial side increases. Further, when the heart contracts, red blood cells carry more oxygen hemoglobin to the peripheral tissues. When the heart relaxes, the heart receives a partial influx of blood from the peripheral tissues. When light is cast to peripheral blood vessels, the light is absorbed by the peripheral tissues. Light absorbance depends on hematocrit and blood volume. The light absorbance may have a maximum value when the heart contracts and may have a minimum value when the heart relaxes. Therefore, light sensed by the light sensing element PD may be the least when the heart contracts and may be the most when the heart relaxes.

Further, when the user puts the finger F on the display panel 100 and lifts it off in the blood pressure measurement mode, a force (contact force) applied to the pressure sensing unit PSU may gradually increase to reach a maximum value, and then may gradually decrease. When the contact force increases, blood vessels may be narrowed, resulting in no blood flow. When the contact force decreases, the blood vessels expand, and thus blood flows again. A further decrease of the contact force results in greater blood flow. Therefore, the change in the amount of light sensed by the light sensing pixel LSP may be proportional to the change in blood flow. Accordingly, the main driving circuit 200 generates the pulse wave signals PPG according to the pressure applied by a user based on a pressure data value (ADC of the pressure sensing unit) that is calculated by the pressure sensing unit PSU and digitally converted and the optical signal (PPG signal ratio) according to the amount of light sensed by the light sensing element PD. The pulse wave signals PPG may have a waveform vibrating according to the cardiac cycle.

The main driving circuit 200 may estimate blood pressures of the blood vessels of the finger F based on time differences between time points PKT corresponding to peaks PK of the calculated pulse wave signals PPG and time points corresponding to peaks of the filtered pulse wave. For example, the main driving circuit 200 may calculate pulse wave signals during preset periods T1 and T2 before and after the time points PKT corresponding to the peaks PK of the calculated pulse wave signal, and may detect blood pressure according to differences between the pulse wave signals. Among the estimated blood pressure values, a maximum blood pressure value may be determined as a systolic blood pressure value, and a minimum blood pressure value may be determined as a diastolic blood pressure value. Further, additional blood pressure values such as an average blood pressure value or the like may be calculated using the estimated blood pressure values.

Figure 19:
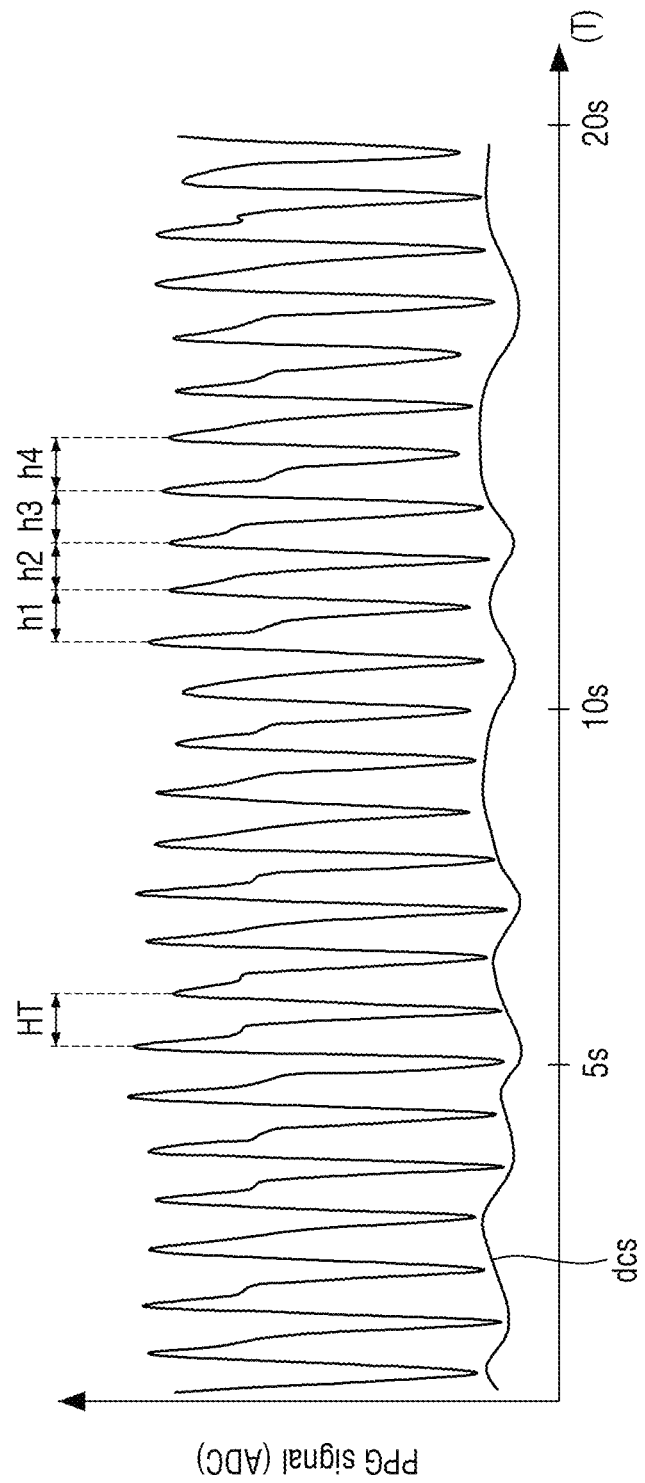
FIG. 19 is a graph illustrating a method for calculating information on a heart rate and respiration among biometric information according to an embodiment.

FIG. 19 is a graph illustrating a method for calculating information on a heart rate and respiration among biometric information according to an embodiment. FIG. 20 is a diagram illustrating a heart rate variability change state measured in real time by feeding it back to a mobile and watch-type display device as an application program screen.

Referring to FIGS. 19 and 20, the main driving circuit 200 may learn signal features (for example, signal feature points) of the pulse wave signals PPG using a machine learning algorithm, and may detect the information on the blood pressure BP according to a signal feature change rate of the pulse wave signals PPG.

For example, the main driving circuit 200 sets an initial value or a reference value for each of a pulse width (h1, for example, systolic and diastolic cycles), an amplitude (h2, for example, systolic blood pressure), a pulse width of the systolic cycle (h3, for example, systolic cycle), a diastolic cycle (h4, for example, pulse width of the diastolic cycle) of each of the pulse wave signals PPG. Thereafter, the main driving circuit 200 detects changes in the features of the pulse wave signals PPG inputted in real time compared to the initial value or the reference value of each of the features, for example, the magnitudes of changes in the systolic and diastolic cycles, changes in the systolic blood pressure, changes in the systolic cycle, and changes in the diastolic cycle, and database them as learning data. The main driving circuit 200 may output the information on the blood pressure BP according to the feature change rate or the magnitude of changes of the pulse wave signals PPG compared to the initial value or the reference value of each of the features.

The method for measuring the blood pressure described above is only exemplary, various other methods are disclosed in Korean Patent Application Publication No. 10-2018-0076050, Korean Patent Application Publication No. 10-2017-0049280, and Korean Patent Application Publication No. 10-2019-0040527, the disclosures of which are herein incorporated by reference in their entirety.

The main driving circuit 200 samples pulse wave signals during a preset sampling period before and after the time points PKT corresponding to the peaks PK of the pulse wave signal, and detects a high pulse generation cycle HT of the sampled pulse wave signals PPG. Further, the number of high pulse generation for a preset reference period (for example, 60 seconds) may be counted for the sampled pulse wave signals PPG to detect biometric information on the heart rate cycle and the heart rate HR.

Further, the main driving circuit 200 detects the heart rate cycle HT and the heart rate cycle changes t1 to t4 of high pulses for each preset reference period for the peaks PK of the pulse wave signal to detect the heart rate variability HRV according to the heart rate cycle change rate.

The main driving circuit 200 sequentially detects the generation cycle and the magnitude value of low pulses of the sampled pulse wave signals PPG. Then, the change cycle of a magnitude value dcs of low pulses may be detected in units of preset reference periods (for example, 60 seconds) to detect the respiratory change state and the respiratory rate RR of a user. At this time, the cycle in which the magnitude value dcs of low pulses increases and the cycle in which the magnitude value dcs of low pulses decreases may be analyzed to detect the respiratory change state and the respiratory rate RR of the user using the increasing cycle and the decreasing cycle of the magnitude value dcs of low pulses.

Referring to FIG. 20, the main driving circuit 200 displays at least one of the biometric information detected in real time, for example, at least one of the biometric information such as the blood pressure BP, the heart rate HR, the heart rate variability HRV, the respiratory rate RR on the application program screen.

Based on the user's option selection, the main driving circuit 200 may display at least one of the biometric information detected in real time as a linear graph image, as text on a table, or in various forms such as a bar graph.

Figure 21:
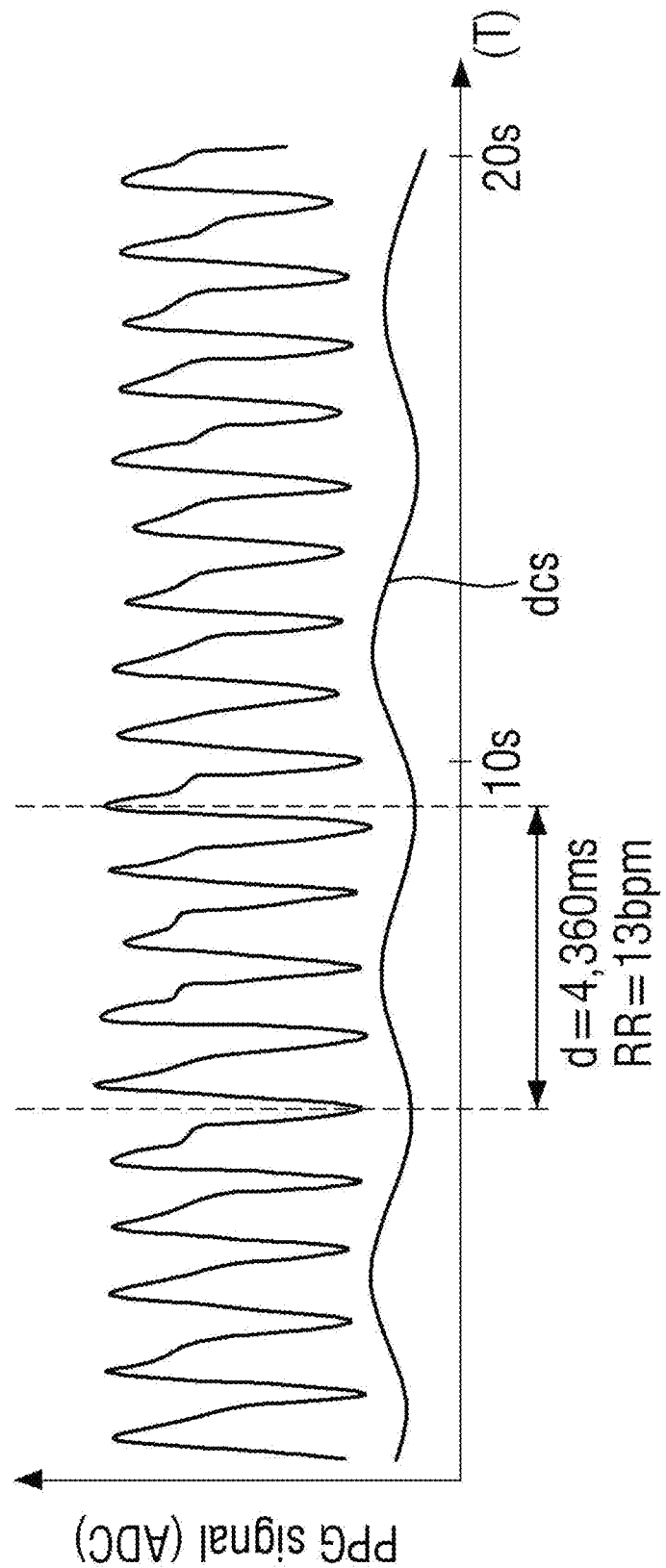
FIG. 21 is a graph illustrating a method for calculating respiratory rate and breathing timing information among biometric information according to an embodiment.

FIG. 21 is a graph illustrating a method for calculating respiratory rate and breathing timing information among biometric information according to an embodiment.

The main driving circuit 200 may display a notification screen for displaying the user's respiratory rate and breathing timing information by feeding them back to the user action guide program during the biometric information measurement period on the display window.

While the user action guide program is being executed, the main driving circuit 200 sequentially detects the generation cycle of low pulses and the magnitude value of low pulses in respect to the pulse wave signals PPG, and analyze the cycle in which the magnitude value dcs of low pulses increases and the cycle in which the magnitude value dcs of low pulses decreases to detect the breathing timing information (e.g., inhalation and exhalation status information) and respiratory rate RR. In addition, the respiratory change state and respiratory rate RR detected in real time are displayed as text on the display window of the biometric information notification screen. At this time, the respiratory change state and the respiratory rate RR may be output as sound. Accordingly, the user can adjust the respiratory rate and breathing timing by referring to the respiratory rate RR and the respiratory change state displayed in the application program screen and audio in real time.

FIG. 22 is a graph illustrating a method for calculating information on blood vessel elasticity among biometric information according to an embodiment.

Referring to FIG. 22, the main driving circuit 200 may set and obtain the blood vessel elasticity BVE by expanding and analyzing the high pulse variation of the sampled pulse wave signals PPG.

When the blood flow increases due to heartbeat, the pulse wave signal is changed to a high pulse form, and when the blood flow decreases, the pulse wave signal is changed again to a low pulse form. If the blood flow changes rapidly due to the shape of the blood vessel during the period in which the blood flow increases or decreases, the change in the blood flow may be quickly relaxed or slowed depending on the elasticity of the blood vessel. Accordingly, the main driving circuit 200 sets and obtains the blood vessel elasticity BVE using a value corresponding to the magnitude of changes in high pulses by expanding and analyzing the high pulse change form of the pulse wave signals PPG.

Figure 23:
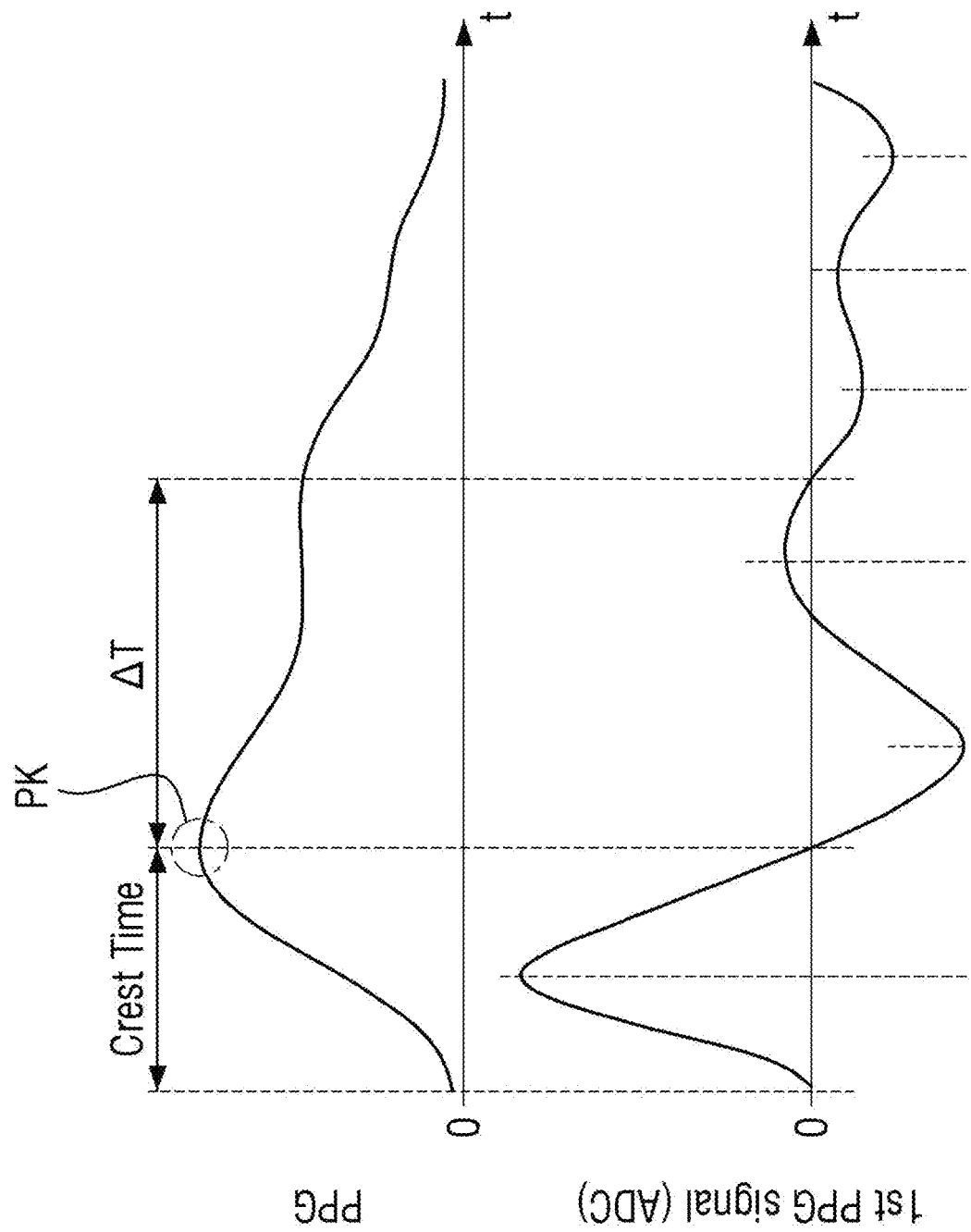
FIG. 23 is a graph illustrating a method for calculating information on a cardiovascular disease among biometric information according to an embodiment.

FIG. 23 is a graph illustrating a method for calculating information on a cardiovascular disease among biometric information according to an embodiment.

Referring to FIG. 23, the main driving circuit 200 may set and obtain a cardiovascular disease evaluation score (or a cardiovascular health analysis result score) by differentiating and expanding and analyzing the high pulse change form of the sampled pulse wave signals PPG. For example, the main driving circuit 200 detects a period (Crest Time) in which the pulse wave signals PPG reach the peak PK in a high pulse form, and time variation $\Delta T$ in which the pulse wave signals PPG fall compared to the period (Crest Time) in which the pulse wave signals PPG reach the peak PK. As the period (Crest Time) in which the pulse wave signals PPG reach the peak PK in a high pulse form increases, the risk of heart disease increases. Accordingly, the main driving circuit 200 may set and obtain the cardiovascular disease evaluation score (or the cardiovascular health analysis result score) in inverse proportion to the period (Crest Time) in which the pulse wave signals PPG reach the peak PK in a high pulse form.

Figure 24:
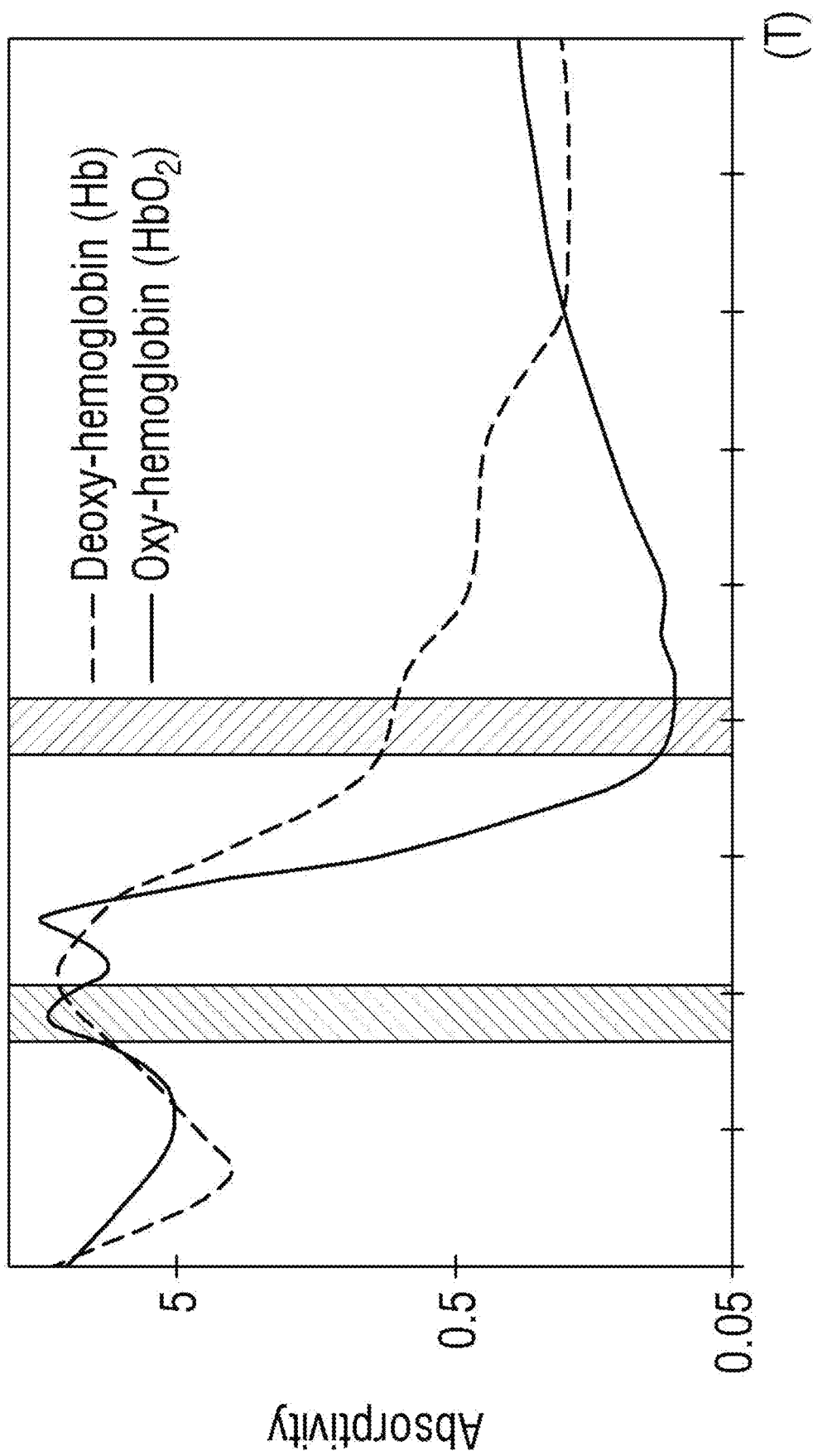
FIG. 24 is a graph illustrating a method for calculating information on oxygen saturation among biometric information according to an embodiment.

FIG. 24 is a graph illustrating a method for calculating information on oxygen saturation among biometric information according to an embodiment.

Referring to FIG. 24, when the heart contracts, red blood cells carry more oxygen hemoglobin to peripheral tissues. When the heart relaxes, the heart receives a partial influx of blood from the peripheral tissues. Using this, the main driving circuit 200 detects a deoxy-hemoglobin (Hb) value using the magnitude change of the pulse wave signals PPG detected by the green light, and detects a $HbO_2$(Oxy-hemoglobin) value using the magnitude change of the pulse wave signals PPG detected by the red light.

The main driving circuit 200 may detect the oxygen saturation ($SpO_2$) using the following Eq. (2).

$$SpO_2 = HpO_2/SpO_2 + Hb \qquad (2)$$

The main driving circuit 200 may display the biometric information such as the blood pressure BP, the heart rate HR, the heart rate variability HRV, the respiratory rate RR, the blood vessel elasticity BVE, the cardiovascular disease (or the cardiovascular health analysis result score), the oxygen saturation ($SpO_2$), or the like on the application program screen.

FIG. 25 is a diagram showing a biometric information measurement result through a mobile display device and a watch type display device.

Referring to FIG. 25, the display device 10 for measuring biometric information such as a blood pressure, a heart rate, heart rate variability, a respiratory rate, blood vessel elasticity, a cardiovascular disease, oxygen saturation, and the like may be applied to a mobile communication terminal such as a smart phone, a tablet display device, or the like. As shown in FIG. 12, the display device 10 for measuring biometric information according to an embodiment of the present disclosure may be equally applied to a wearable device such as a smart watch, a watch phone, or the like.

The main driving circuit 200 applied to a mobile communication terminal or a wearable device selects more accurate pulse wave signals PPG detected during the normal pulse wave signal detection period and measure at least one of the biometric information. The main driving circuit 200 analyzes a high pulse cycle and a high pulse cycle change amount of the pulse wave signals PPG detected during the normal pulse wave signal detection period, a high pulse magnitude and a change amount thereof, a low pulse magnitude and a change amount thereof, a signal waveform change, a period in which a high pulse reaches a peak, the difference in the pulse magnitude of the pulse wave signals PPG respectively detected by green light and red light, and the like. Then, the biometric information such as a blood pressure BP, a heart rate HR, heart rate variability HRV, a respiratory rate RR, blood vessel elasticity BVE, a cardiovascular disease (or, a cardiovascular health analysis result score), oxygen saturation, or the like is obtained according to the analysis result, and the obtained result is displayed on the application program screen.

In concluding the detailed description, those skilled in the art will appreciate that many variations and modifications can be made to the preferred embodiments without substantially departing from the principles of the present disclosure.

What is claimed is:

1. A display device, comprising:
a display panel including a display area, the display area including a plurality of display pixels and a plurality of light sensing pixels;
a display scan driver configured to drive the display pixels to emit light;
a light sensing scan driver configured to drive the light sensing pixels to sense light; and
a main driving circuit configured to use the light sensing signals received through the light sensing pixels to detect pulse wave signals and measure biometric information,
wherein the main driving circuit is configured to determine a normal pulse wave signal detection period or an inaccurate pulse wave signal detection period at a biometric information measurement start period, change detection conditions of the pulse wave signals at the inaccurate pulse wave signal detection period and re-detect the pulse wave signals and re-measure the biometric information during the normal pulse wave signal detection period.

2. The display device of claim 1, wherein the main driving circuit is configured to:
display a touch sensing area of a body part through an application program screen on the display area;
display a waveform of the pulse wave signals detected in real time on a display window of the application program screen; and
display a period in which the pulse wave signals are detected and a pulse wave signals detection period required for the biometric information measurement in the form of a circular or bar graph.

3. The display device of claim 2, wherein the main driving circuit is configured to:
generate the pulse wave signals corresponding to a magnitude and a magnitude change of the light sensing signals;
analyze a high pulse magnitude change and a low pulse magnitude change of the pulse wave signals in real time to calculate an average magnitude value of high pulses and an average magnitude value of low pulses, in real time; and
set the normal pulse wave signal detection period or the inaccurate pulse wave signal detection period in real time according to a result of comparing the calculated average magnitude value of the high pulses and a preset high threshold and a result of comparing the calculated average magnitude value of the low pulses and a preset low threshold.

4. The display device of claim 3, wherein the main driving circuit has a period in which the pulse wave signals are not generated and are cut off, or detects the average magnitude value of high pulses to be smaller than the preset high threshold value during plurality of preset frame periods, or sets the inaccurate pulse wave signal detection period when the average magnitude value of low pulses is detected to be lower than the preset low threshold value during plurality of preset frame periods.

5. The display device of claim 4, wherein the main driving circuit is configured to display a touch guide message on the application program screen so that the body part may be accurately touched and a touch state may be maintained during the inaccurate pulse wave signal detection period, and changes waveform of pulse wave signals and the touch guide message displayed on the display window in real time to a warning color of red.

6. The display device of claim 5, wherein the main driving circuit is configured to display a touch guide message guiding so that a touch state is maintained as "normal" on the application program screen when the normal pulse wave signal detection period is set, and changes a waveform of the pulse wave signals and the touch guide message displayed on the display window in real time to a normal progress color of green or blue.

7. The display device of claim 6, wherein the main driving circuit is configured to analyze a high pulse cycle and a high pulse cycle change amount of the pulse wave signals detected during the normal pulse wave signal detection period, a high pulse magnitude and a change amount thereof, a low pulse magnitude and a change amount thereof, a waveform change of the high pulse, a period in which the high pulse reaches a peak, the difference in the pulse magnitude of the pulse wave signals respectively detected by green light and red light, and derives at least one biometric information among a blood pressure, a heart rate, heart rate variability, a respiratory rate, blood vessel elasticity, occurrence or non-occurrence of a cardiovascular disease, oxygen saturation, and displays the derived biometric information through the application program screen.

8. The display device of claim 3, wherein main driving circuit is configured to generate an image based on the light sensing signal value and the arrangement position of the light sensing pixels which outputted light sensing signals detected by the light sensing pixels during the inaccurate pulse wave signal detection period, and display a touch guide message guiding so that a body part touch state is accurately touched and guided when a touch area derived by the light sensing signal value and the image is smaller than a preset reference area on the application program screen.

9. The display device of claim 8, wherein the main driving circuit is configured to receive pressure data of an area pressed by a body part and a sensing coordinate data of a position where a pressure is sensed through a touch driving circuit, analyze a touch pressure and a touch shape based on the pressure data and the sensing coordinate data of the position where a pressure is sensed, and display a pressure guide message in respect to a body part on the application program screen when the touch pressure decreases below a preset reference pressure or a touch area according to the touch shape is smaller than a reference area.

10. The display device of claim 8, wherein the main driving circuit is configured to increase a voltage magnitude of data voltage in preset steps to increase light emitting luminance of the display pixels or infrared light emitting pixels during the inaccurate pulse wave signal detection period and supply it to data lines of the display pixels or the infrared light emitting pixels.

11. The display device of claim 8, wherein the main driving circuit is configured to increase the number of supplying of sensing scan signals at least in units of one frame period so that the number of detections of the light sensing pixels increases at least in units of one frame period at the inaccurate pulse wave signal detection period, and supply the sensing scan signals to light sensing scan lines connected to the light sensing pixels.

12. The display device of claim 8, wherein the main driving circuit is configured to increase a voltage magnitude of sensing scan signals turning on sensing transistors of the light sensing pixels in steps during the inaccurate pulse wave signal detection period and supply them to light sensing scan lines connected to the sensing transistors.

13. The display device of claim 3, wherein main driving circuit is configured to generate a capacitance profile for signal values based on the signal values detected by the light sensing pixels during the inaccurate pulse wave signal detection period, analyze a touch area or a touch shape based on the arrangement position of the light sensing pixels which outputted light sensing signals, and the capacitance profile, and display a touch guide message guiding so that a body part touch state is accurately touched and guided when the touch area is smaller than a preset reference area on the application program screen.

14. A display device, comprising:
   a display panel including a display area, the display area including a plurality of display pixels, a plurality of light sensing pixels, and a plurality of infrared light emitting pixels;
   a display scan driver configured to drive the display pixels to emit light;
   a light sensing scan driver configured to drive the light sensing pixels to sense light;
   a touch sensor disposed on a front surface of the display panel and configured to sense a touch and output a touch sensing signal;
   a touch driving circuit configured to generate touch data and touch coordinate data according to a magnitude change and an output position of the touch sensing signal; and
   a main driving circuit configured to detect pulse wave signals and measure biometric information using light sensing signals received through the light sensing pixels,
   wherein the main driving circuit is configured to determine a normal pulse wave signal detection period or an inaccurate pulse wave signal detection period at a biometric information measurement start period, change detection conditions of the pulse wave signals at the inaccurate pulse wave signal detection period and re-detect the pulse wave signals, and re-measure the biometric information during the normal pulse wave signal detection period.

15. The display device of claim 14, wherein the main driving circuit is configured to:
   generate the pulse wave signals corresponding to a magnitude and a magnitude change of the light sensing signals;
   analyze a high pulse magnitude change and a low pulse magnitude change of the pulse wave signals in real time to calculate an average magnitude value of high pulses and an average magnitude value of low pulses, in real time; and
   set a normal pulse wave signal detection period or the inaccurate pulse wave signal detection period in real time according to a result of comparing the calculated average magnitude value of the high pulses and a preset high threshold and a result of comparing the calculated average magnitude value of the low pulses and a preset low threshold.

16. The display device of claim 15, wherein main driving circuit is configured to generates an image based on the light sensing signal value and the arrangement position of the light sensing pixels which outputted light sensing signals detected by the light sensing pixels during the inaccurate pulse wave signal detection period, and display a touch guide message guiding so that a body part touch state is accurately touched and guided when a touch area derived by the light sensing signal value and the image is smaller than a preset reference area on the application program screen.

17. The display device of claim 16, wherein the main driving circuit is configured to:
   receive a pressure data of an area pressed by a body part and a sense coordinate data of a position where a pressure is sensed through a touch driving circuit;
   analyze a touch pressure and a touch shape based on the pressure data and the sensing coordinate data of the position where a pressure is sensed; and
   display pressure guide message in respect to a body part on the application program screen when the touch pressure decreases below a preset reference pressure or a touch area according to the touch shape is smaller than a reference area.

18. The display device of claim 16, wherein the main driving circuit is configured to increase a voltage magnitude of data voltage in preset steps to increase light emitting luminance of the display pixels or infrared light emitting pixels during the inaccurate pulse wave signal detection period and supply it to the data lines of the display pixels or the infrared light emitting pixels, or
   wherein the main driving circuit is configured to increase a voltage magnitude of sensing scan signals turning on sensing transistors of the light sensing pixels in steps during the inaccurate pulse wave signal detection period and supply them to light sensing scan lines connected to the sensing transistors.

19. The display device of claim 16, wherein the main driving circuit is configured to increase the number of supplying of sensing scan signals at least in units of one frame period so that the number of detections of the light sensing pixels increases at least in units of one frame period at the inaccurate pulse wave signal detection period, and supply the sensing scan signals to light sensing scan lines connected to the light sensing pixels.

20. An electronic device, comprising:
   a display panel including a display area, the display area including a plurality of display pixels and a plurality of light sensing pixels;
   a display scan driver configured to drive the display pixels to emit light;
   a light sensing scan driver configured to drive the light sensing pixels to sense light; and
   a main driving circuit configured to use the light sensing signals received through the light sensing pixels to detect pulse wave signals and measure biometric information,
   wherein the main driving circuit is configured to determine a normal pulse wave signal detection period or an inaccurate pulse wave signal detection period at a biometric information measurement start period, change detection conditions of the pulse wave signals at the inaccurate pulse wave signal detection period and re-detect the pulse wave signals and re-measure the biometric information during the normal pulse wave signal detection period.

* * * * *